US010544973B2

(12) United States Patent
Morimoto et al.

(10) Patent No.: US 10,544,973 B2
(45) Date of Patent: Jan. 28, 2020

(54) AIR-CONDITIONING APPARATUS WITH TEMPERATURE CONTROLLED PUMP OPERATION

(75) Inventors: Osamu Morimoto, Tokyo (JP); Daisuke Shimamoto, Tokyo (JP); Koji Azuma, Tokyo (JP); Takayoshi Honda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 702 days.

(21) Appl. No.: 14/342,883

(22) PCT Filed: Dec. 16, 2011

(86) PCT No.: PCT/JP2011/007041
§ 371 (c)(1),
(2), (4) Date: Mar. 5, 2014

(87) PCT Pub. No.: WO2013/088482
PCT Pub. Date: Jun. 20, 2013

(65) Prior Publication Data
US 2014/0223940 A1 Aug. 14, 2014

(51) Int. Cl.
F25B 49/02 (2006.01)
F25B 13/00 (2006.01)
(Continued)

(52) U.S. Cl.
CPC .............. *F25B 49/027* (2013.01); *F24D 3/18* (2013.01); *F24D 19/1039* (2013.01);
(Continued)

(58) Field of Classification Search
CPC .............. F25B 2600/11; F25B 2600/13; F25B 2600/15; F25B 2600/112;
(Continued)

(56) References Cited

U.S. PATENT DOCUMENTS 2,545,206 A * 3/1951 Main ................... F24D 19/1006
165/243
4,153,104 A * 5/1979 Ruder ................. F24D 11/0221
165/48.2

(Continued)

FOREIGN PATENT DOCUMENTS

DE 2524010 * 12/1976
EP 1 484 559 A1 12/2004

(Continued)

OTHER PUBLICATIONS

Office Action dated May 7, 2015 in the corresponding CN patent application No. 201180074199.7 ( English translation attached ).

(Continued)

*Primary Examiner* — Nelson J Nieves
(74) *Attorney, Agent, or Firm* — Posz Law Group, PLC

(57) ABSTRACT

An air-conditioning apparatus includes a refrigeration cycle that includes an intermediate heat exchanger configured to exchange heat between a heat source side refrigerant and a heat medium different from the heat source side refrigerant. The apparatus further includes a heat medium circuit that includes at least one pump configured to circulate the heat medium in the intermediate heat exchanger. A controller in the apparatus further activates the pump to circulate the heat medium through the heat medium circuit when, during suspension of an air conditioning operation, the detected temperature of outdoor air is at or below a first predetermined temperature and a first predetermined period of time has elapsed since the pump was stopped.

19 Claims, 8 Drawing Sheets

(51) Int. Cl.
  *F24D 3/18* (2006.01)
  *F24D 19/10* (2006.01)
  *F24F 3/06* (2006.01)

(52) U.S. Cl.
  CPC ........ *F25B 13/00* (2013.01); *F24D 2200/123* (2013.01); *F24F 3/065* (2013.01); *F25B 2313/006* (2013.01); *F25B 2313/023* (2013.01); *F25B 2313/0231* (2013.01); *F25B 2313/0272* (2013.01); *F25B 2313/02741* (2013.01); *F25B 2313/0315* (2013.01); *F25B 2341/0661* (2013.01); *F25B 2600/02* (2013.01); *Y02B 30/12* (2013.01)

(58) Field of Classification Search
  CPC .......... F25B 2700/2106; F25B 2347/02; F24F 2011/0065; F24F 2011/0083; F24F 2011/0089
  See application file for complete search history.

(56) References Cited

U.S. PATENT DOCUMENTS

| | | | | |
|---|---|---|---|---|
| 4,294,083 A * | 10/1981 | King | ............... | F25D 17/02 62/201 |
| 4,909,041 A * | 3/1990 | Jones | ............... | F24D 11/0214 62/99 |
| 9,050,360 B1 * | 6/2015 | Scaringe | ............... | F25B 49/02 |
| 2005/0026013 A1 * | 2/2005 | Sakakida | ............... | H01M 8/04223 429/429 |
| 2005/0189431 A1 * | 9/2005 | Nakayama | ............... | F25B 40/00 237/12 |
| 2007/0028631 A1 * | 2/2007 | Fukuda | ............... | F25D 17/02 62/185 |
| 2007/0032909 A1 * | 2/2007 | Tolbert, Jr. | ............... | F25B 49/025 700/276 |
| 2009/0019874 A1 * | 1/2009 | Park | ............... | F24F 1/00 62/259.1 |
| 2009/0277197 A1 * | 11/2009 | Gambiana | ............... | F25B 39/028 62/115 |
| 2010/0192599 A1 * | 8/2010 | Kim | ............... | F24F 11/30 62/80 |
| 2010/0282434 A1 * | 11/2010 | Yabuuchi | ............... | F24D 11/0235 165/63 |
| 2011/0302947 A1 * | 12/2011 | Honda | ............... | F24D 3/02 62/324.6 |
| 2012/0042674 A1 * | 2/2012 | Takenaka | ............... | F24F 3/06 62/180 |
| 2012/0090341 A1 * | 4/2012 | Hatada | ............... | F25B 27/00 62/238.7 |
| 2012/0102980 A1 * | 5/2012 | Benouali | ............... | F25B 41/062 62/56 |
| 2013/0030783 A1 * | 1/2013 | Nishiguchi | ............... | G05B 13/0265 703/13 |
| 2013/0086932 A1 * | 4/2013 | Ishizeki | ............... | F25B 49/005 62/125 |

FOREIGN PATENT DOCUMENTS

| | | | | |
|---|---|---|---|---|
| EP | 2 309 199 A1 | | 4/2011 | |
| JP | 2000-186868 A | | 7/2000 | |
| JP | 2002-048399 A | | 2/2002 | |
| JP | 2003-222391 A | | 8/2003 | |
| JP | 2006-112781 A | | 4/2006 | |
| JP | 2009-236392 A | | 10/2009 | |
| JP | WO 2010050004 A1 * | | 5/2010 | ............ F24F 11/001 |
| JP | 2011214744 A * | | 10/2011 | |
| WO | 2010/049998 A1 | | 5/2010 | |
| WO | 2011/099054 A1 | | 8/2011 | |

OTHER PUBLICATIONS

Office Action dated Feb. 17, 2015 issued in corresponding JP patent application No. 2013-548962 (and English translation).
International Search Report of the International Searching Authority dated Jan. 31, 2012 for the corresponding international application No. PCT/JP2011/007041 (with English translation).
Extended European Search Report dated Jul. 20, 2015 issued in corresponding EP patent application No. 11877584.0.

* cited by examiner

F I G. 4
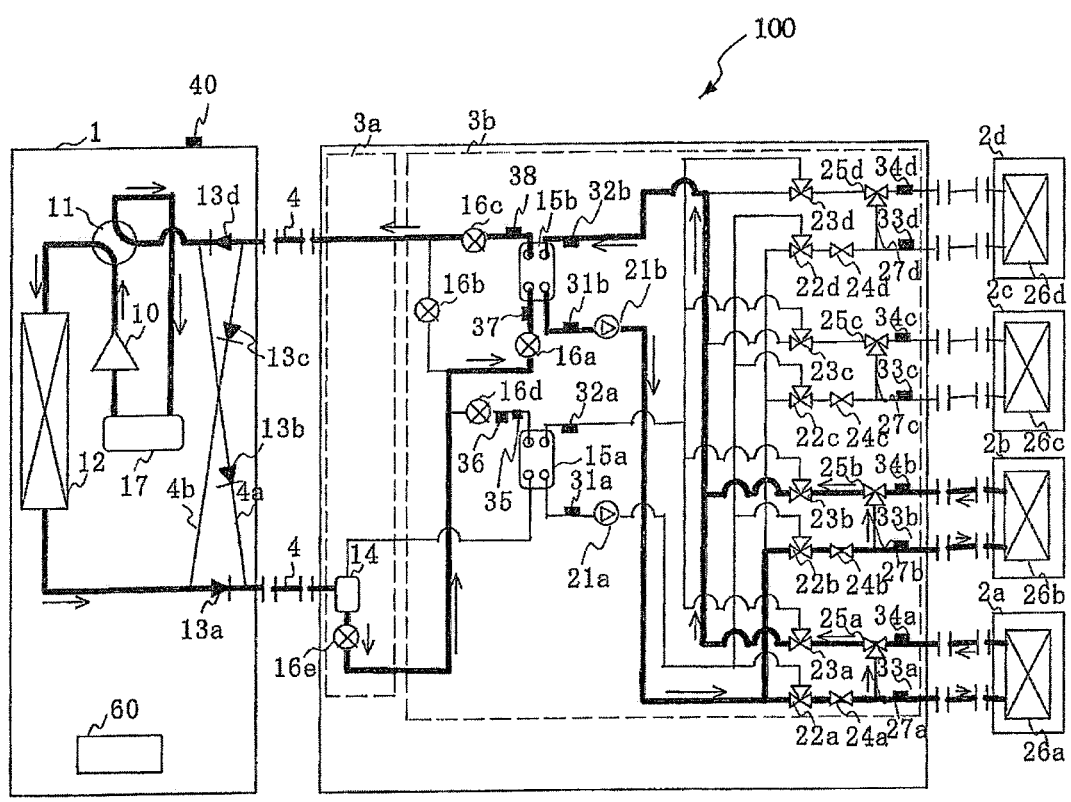

AIR-CONDITIONING APPARATUS WITH TEMPERATURE CONTROLLED PUMP OPERATION

CROSS REFERENCE TO RELATED APPLICATION

This application is a U.S. national stage application of International Patent Application No. PCT/JP2011/007041 filed on Dec. 16, 2011.

TECHNICAL FIELD

The present invention relates to an air-conditioning apparatus which is used as, for example, a multi-air-conditioning apparatus for a building.

BACKGROUND

There is an air-conditioning apparatus that allows a heat source side refrigerant to exchange heat with an indoor side refrigerant (heat medium), the heat source side refrigerant circulating through a refrigeration cycle (refrigerant circuit) which includes an outdoor unit and a relay unit connected by pipes, the indoor side refrigerant circulating through a heat medium circuit which includes the relay unit and an indoor unit connected by pipes. The air-conditioning apparatuses having such a configuration used as building multi-air-conditioning apparatuses include an air-conditioning apparatus configured such that conveyance power for the heat medium is reduced to achieve energy saving (refer to Patent Literature 1, for example).

CITATION LIST

Patent Literature

Patent Literature 1: International Publication No. WO 2010/049998 (p. 3, FIG. 1, for example)

Technical Problem

In the above-described air-conditioning apparatus disclosed in Patent Literature 1, water or the like is used as the heat medium. While circulation of the heat medium is stopped, therefore, the heat medium may freeze depending on environment in which the heat medium circuit is placed. If the heat medium has frozen, the heat medium will increase in volume, thus causing pipes to be damaged, for example.

SUMMARY

The present invention has been made to solve the above-described disadvantage and provides an air-conditioning apparatus capable of preventing freezing of a heat medium flowing through a heat medium circuit.

The invention provides an air-conditioning apparatus including a refrigeration cycle that includes a compressor configured to compress a heat source side refrigerant, a refrigerant flow switching device configured to switch between paths for circulation of the heat source side refrigerant, a heat source side heat exchanger configured to allow the heat source side refrigerant to exchange heat, an expansion device configured to regulate a pressure of the heat source side refrigerant, and at least one intermediate heat exchanger configured to exchange heat between the heat source side refrigerant and a heat medium different from the heat source side refrigerant, the compressor, the refrigerant flow switching device, the heat source side heat exchanger, the expansion device, and the intermediate heat exchanger being connected by pipes, a heat medium circuit that includes at least one pump configured to circulate the heat medium related to heat exchange in the intermediate heat exchanger, a use side heat exchanger configured to exchange heat between the heat medium and air related to an air-conditioned space, and a flow switching valve configured to switch between a passage for the heated heat medium through the use side heat exchanger and a passage for the cooled heat medium therethrough, the pump, the use side heat exchanger, and the flow switching valve being connected by pipes, an outdoor air temperature detection device configured to detect the temperature of outdoor air, and a controller configured to, when determining during suspension of an operation related to air conditioning that the temperature detected by the outdoor air temperature detection device is at or below a first predetermined temperature and a first predetermined period of time has elapsed since the last stop of the pump, perform control such that the pump is activated to circulate the heat medium through the heat medium circuit.

According to the invention, the air-conditioning apparatus is configured such that when the controller determines during suspension of the operation related to air conditioning that the temperature of the outdoor air is at or below the first predetermined temperature, the controller activates the pump to circulate the heat medium through the heat medium circuit. Accordingly, the heat medium can be prevented from freezing. In this case, furthermore, when the controller determines that the first predetermined period of time has elapsed since the last stop of the pump and the heat medium might have reached its freezing temperature, the controller activates the pump. Thus, the number of activations of the pump is not unduly increased and, accordingly, energy saving can be achieved.

BRIEF DESCRIPTION OF DRAWINGS

FIG. 4 is a refrigerant circuit diagram illustrating the flows of refrigerants in a cooling only operation mode of the air-conditioning apparatus according to Embodiment 1.

DETAILED DESCRIPTION

Embodiment 1

Figure 1:
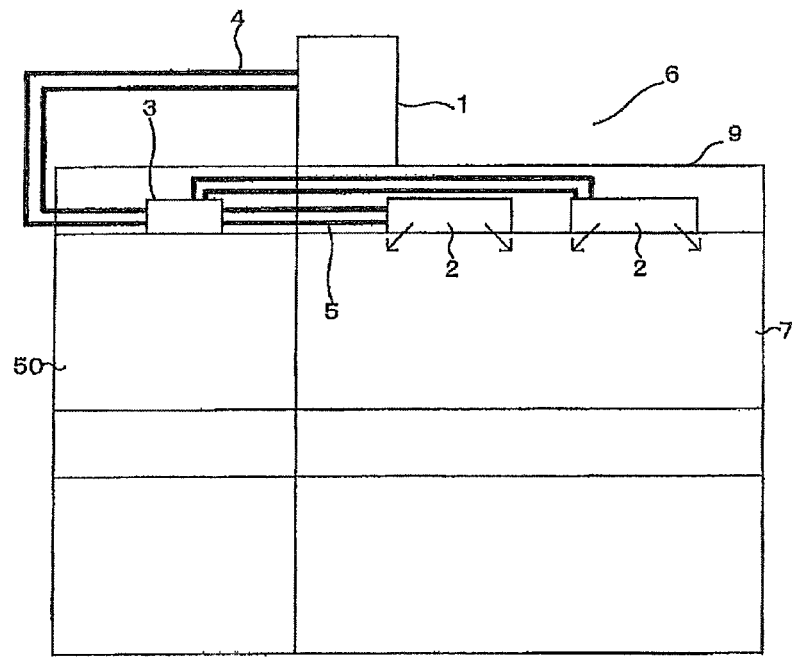
FIG. 1 is an overall configuration diagram illustrating an exemplary installation state of an air-conditioning apparatus according to Embodiment 1.
Figure 2:
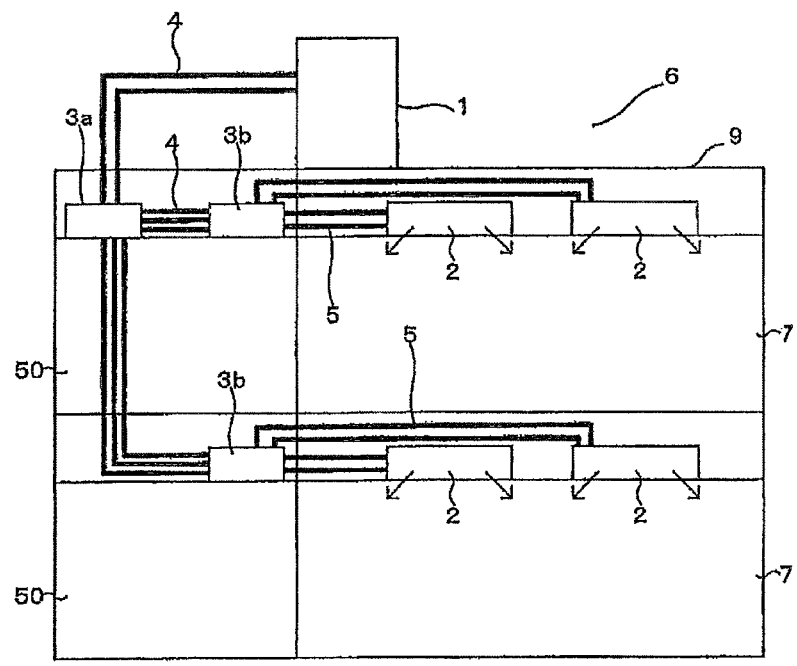
FIG. 2 is an overall configuration diagram illustrating another exemplary installation state of the air-conditioning apparatus according to Embodiment 1.

FIGS. 1 and 2 are overall configuration diagrams each illustrating an exemplary installation state of an air-conditioning apparatus according to Embodiment 1 of the present invention. The configuration of the air-conditioning apparatus will be described with reference to FIGS. 1 and 2. This air-conditioning apparatus includes a refrigeration cycle through which a heat source side refrigerant is circulated and a heat medium circuit through which a heat medium, such as water or antifreeze, is circulated, and is configured to perform a cooling operation or a heating operation. Note that the dimensional relationship among components in FIG. 1 and the following figures may be different from the actual one. Furthermore, in the following description, when a plurality of devices of the same kind distinguished from one another using subscripts do not have to be distinguished from one another or specified, the subscripts may be omitted. As regards levels of temperature, pressure, or the like, the levels are not determined in relation to a particular absolute value but are relatively determined depending on, for example, a state or operation of a system, an apparatus, or the like.

As illustrated in FIG. 1, the air-conditioning apparatus according to Embodiment 1 includes a single heat source unit 1, such as a heat source device, a plurality of indoor units 2, and a relay unit 3 disposed between the heat source unit 1 and the indoor units 2. The relay unit 3 is configured to exchange heat between a heat source side refrigerant and a heat medium. The heat source unit 1 is connected to the relay unit 3 by refrigerant pipes 4 through which the heat source side refrigerant is conveyed and the relay unit 3 is connected to each indoor unit 2 by pipes 5 through which the heat medium is conveyed, such that cooling energy or heating energy produced in the heat source unit 1 is delivered to the indoor units 2. Note that the number of heat source units 1 connected, the number of indoor units 2 connected, and the number of relay units 3 connected are not limited to the numbers illustrated in FIG. 1 or FIG. 2.

The heat source unit 1 is typically disposed in an outdoor space 6 which is a space outside a structure 9, such as a building, and is configured to supply cooling energy or heating energy through the relay unit 3 to the indoor units 2. Each indoor unit 2 is disposed in a living space 7, such as a living room or a server room inside the structure 9, to which cooling air or heating air can be conveyed, and is configured to supply the cooling air or the heating air to the living space 7, serving as an air-conditioned area. The relay unit 3 includes a housing separated from housings of the heat source unit 1 and the indoor units 2 such that the relay unit 3 can be disposed in a different space (hereinafter, referred to as a "non-living space 50") from those of the outdoor space 6 and the living spaces 7. The relay unit 3 connects the heat source unit 1 to the indoor units 2 to transfer cooling energy or heating energy, supplied from the heat source unit 1, to the indoor units 2.

The outdoor space 6 is imagined to be a place outside the structure 9, for example, a roof as illustrated in FIG. 1. The non-living space 50 is imagined to be a space which is inside the structure 9 but is different from the living spaces 7, specifically, a place in which people do not present at all times, for example, a space above a corridor, a space above a ceiling of a shared zone, a shared space in which an elevator or the like is installed, a machine room, a computer room, a stockroom, or the like. The living space 7 is imagined to be a place which is inside the structure 9 and in which people present at all times, or many or a few people temporarily present, for example, an office, a classroom, a conference room, a dining hall, a server room, or the like.

The heat source unit 1 and the relay unit 3 are connected using two refrigerant pipes 4. The relay unit 3 and each indoor unit 2 are connected using two pipes 5. As described above, since the heat source unit 1 is connected to the relay unit 3 by the two refrigerant pipes 4 and each indoor unit 2 is connected to the relay unit 3 by the two pipes 5, the air-conditioning apparatus is easily constructed.

Referring to FIG. 2, the relay unit 3 may be separated into a single first relay unit 3a and two second relay units 3b derived from the first relay unit 3a. This separation allows a plurality of second relay units 3b to be connected to the single first relay unit 3a. In this configuration, the first relay unit 3a is connected to each second relay unit 3b by three refrigerant pipes 4. This pipe arrangement will be described in detail later.

Although FIGS. 1 and 2 illustrate a case where the indoor units 2 are of a ceiling cassette type, the indoor units are not limited to this type and may be of any type, such as a ceiling concealed type or a ceiling suspended type, capable of supplying cooling energy or heating energy into the living space 7 directly or through a duct or the like.

Although FIG. 1 illustrates the case where the heat source unit 1 is disposed in the outdoor space 6, the arrangement is not limited to this case. For example, the heat source unit 1 may be disposed in an enclosed space, for example, a machine room with a ventilation opening. The heat source unit 1 may be disposed inside the structure 9 as long as waste heat can be exhausted through an exhaust duct to the outside of the structure 9. Alternatively, the heat source unit 1 may be disposed inside the structure 9 in the use of the heat source unit 1 of a water-cooled type. Even when the heat source unit 1 is disposed in such a place, no problem in particular will occur.

Furthermore, the relay unit 3 can be disposed near the heat source unit 1. If the distance between the relay unit 3 and each indoor unit 2 is too long, the conveyance power for the heat medium would be considerably large, leading to a reduction in the effect of energy saving.

Figure 3:
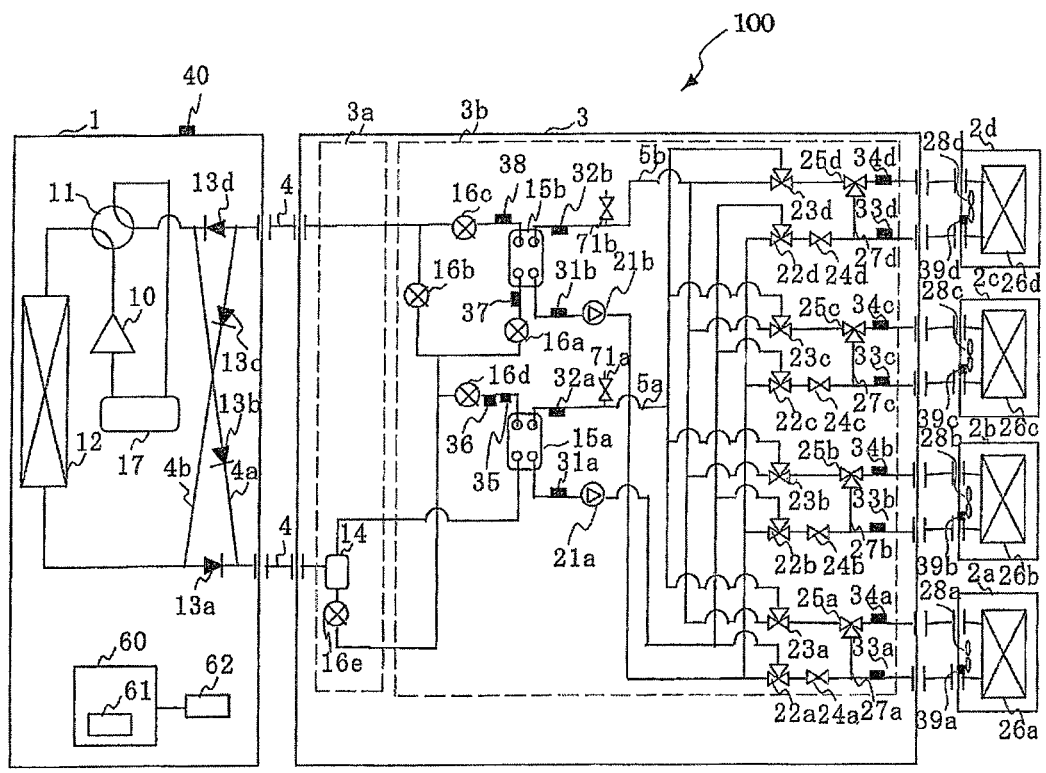
FIG. 3 is a schematic circuit diagram illustrating the configuration of the air-conditioning apparatus according to Embodiment 1.

FIG. 3 is a schematic circuit diagram illustrating the configuration of an air-conditioning apparatus 100 according to Embodiment 1. FIG. 3 illustrates an exemplary configuration of the air-conditioning apparatus including a refrigeration cycle and a heat medium circuit. The configuration of the air-conditioning apparatus 100 will be described in detail with reference to FIG. 3. Referring to FIG. 3, the heat source unit 1 and the relay unit 3 are connected through a first intermediate heat exchanger 15a and a second intermediate heat exchanger 15b which are arranged in the second relay unit 3b. The relay unit 3 and each indoor unit 2 are connected through the first intermediate heat exchanger 15a and the second intermediate heat exchanger 15b arranged in the second relay unit 3b. The configurations and functions of components included in the air-conditioning apparatus 100 will be described below. FIG. 3 and the following figures illustrate an arrangement in which the relay unit 3 is separated into the first relay unit 3a and the second relay unit 3b.

(Heat Source Unit 1)

The heat source unit 1 includes a compressor 10, a four-way valve 11, a heat source side heat exchanger (outdoor heat exchanger) 12, and an accumulator 17 which are connected in series by the refrigerant pipes 4. The heat source unit 1 further includes a first connecting pipe 4a, a second connecting pipe 4b, a check valve 13a, a check valve 13b, a check valve 13c, and a check valve 13d. The arrangement of the first connecting pipe 4a, the second connecting pipe 4b, and the check valves 13a, 13b, 13c, and 13d enables the heat source side refrigerant, allowed to flow into the relay unit 3, to flow in a given direction irrespective of an operation requested by any indoor unit 2.

The compressor 10 is configured to suck the heat source side refrigerant and compress the heat source side refrigerant into a high-temperature high-pressure state and may be, for example, a capacity-controllable inverter compressor. The four-way valve 11 is configured to switch between the direction of flow of the heat source side refrigerant during a heating operation and the direction of flow of the heat source side refrigerant during a cooling operation. The heat source side heat exchanger 12 is configured to function as an evaporator during the heating operation and function as a condenser during the cooling operation so as to exchange heat between the heat source side refrigerant and air supplied from an air-sending device (not illustrated), such as a fan, such that the heat source side refrigerant evaporates and gasifies or condenses and liquefies. The accumulator 17 is disposed on a suction side of the compressor 10 and is configured to store an excess of the refrigerant.

The check valve 13d is disposed in the refrigerant pipe 4 between the relay unit 3 and the four-way valve 11 and is configured to permit the heat source side refrigerant to flow only in a predetermined direction (the direction from the relay unit 3 to the heat source unit 1). The check valve 13a is disposed in the refrigerant pipe 4 between the heat source side heat exchanger 12 and the relay unit 3 and is configured to permit the heat source side refrigerant to flow only in a predetermined direction (the direction from the heat source unit 1 to the relay unit 3). The check valve 13b is disposed in the first connecting pipe 4a and is configured to permit the heat source side refrigerant to flow only in a direction from a point downstream of the check valve 13d to a point downstream of the check valve 13a. The check valve 13c is disposed in the second connecting pipe 4b and is configured to permit the heat source side refrigerant to flow only in a direction from a point upstream of the check valve 13d to a point upstream of the check valve 13a.

The first connecting pipe 4a connects the refrigerant pipe 4 downstream of the check valve 13d to the refrigerant pipe 4 downstream of the check valve 13a in the heat source unit 1. The second connecting pipe 4b connects the refrigerant pipe 4 upstream of the check valve 13d to the refrigerant pipe 4 upstream of the check valve 13a in the heat source unit 1. Although FIG. 3 illustrates an exemplary arrangement of the first connecting pipe 4a, the second connecting pipe 4b, and the check valves 13a, 13b, 13c, and 13d, the arrangement is not limited to this case. These components do not necessarily have to be arranged.

(Indoor Units 2)

The indoor units 2 each include a use side heat exchanger 26. The use side heat exchanger 26 is connected through the pipes 5 to a stop valve 24 and a flow rate control valve 25 which are arranged in the second relay unit 3b. The use side heat exchanger 26 is configured to exchange heat between the heat medium and air supplied by driving of an indoor fan 28 in order to produce heating air or cooling air to be supplied to the air-conditioned area.

FIG. 3 illustrates a case where four indoor units 2 are connected to the second relay unit 3b. An indoor unit 2a, an indoor unit 2b, an indoor unit 2c, and an indoor unit 2d are illustrated in that order from the bottom of the drawing sheet. In addition, the use side heat exchangers 26 are illustrated as a use side heat exchanger 26a, a use side heat exchanger 26b, a use side heat exchanger 26c, and a use side heat exchanger 26d in that order from the bottom of the drawing sheet so as to correspond to the indoor units 2a to 2d, respectively. Similarly, the indoor fans 28 are illustrated as an indoor fan 28a, an indoor fan 28b, an indoor fan 28c, and an indoor fan 28d in that order from the bottom of the drawing sheet. Note that the number of indoor units 2 connected is not limited to four, as illustrated in FIG. 3, as in the case of FIG. 1.

(Relay Unit 3)

The relay unit 3 is composed of the first relay unit 3a and the second relay unit 3b which include separate housings. As described above, this configuration enables a plurality of second relay units 3b to be connected to the single first relay unit 3a. The first relay unit 3a includes a gas-liquid separator 14 and an expansion valve 16e. The second relay unit 3b includes the two intermediate heat exchangers 15, four expansion valves 16, two pumps 21, four flow switching valves 22, four flow switching valves 23, the four stop valves 24, and the four flow rate control valves 25.

The gas-liquid separator 14 is connected to the refrigerant pipe 4 which connects to the heat source unit 1 and the two refrigerant pipes 4 which connect to the first intermediate heat exchanger 15a and the second intermediate heat exchanger 15b in the second relay unit 3b and is configured to separate the heat source side refrigerant supplied from the heat source unit 1 into a vapor refrigerant and a liquid refrigerant. The expansion valve 16e is disposed between the gas-liquid separator 14 and the refrigerant pipe 4 which connects the expansion valve 16a and the expansion valve 16b and is configured to function as a pressure reducing valve or an expansion device so as to reduce the pressure of the heat source side refrigerant such that the refrigerant is expanded. The expansion valve 16e may be a component having a variably controllable opening degree, for example, an electronic expansion valve.

The two intermediate heat exchangers 15 (the first intermediate heat exchanger 15a and the second intermediate heat exchanger 15b) are configured to function as a heating device (condenser) or a cooling device (cooler), exchange heat between the heat source side refrigerant and the heat medium, and supply cooling energy or heating energy produced by the heat source unit 1 to the indoor units 2. The first intermediate heat exchanger 15a is disposed between the gas-liquid separator 14 and the expansion valve 16d in the flow direction of the heat source side refrigerant and is used to heat the heat medium. The second intermediate heat exchanger 15b is disposed between the expansion valves 16a and 16c in the flow direction of the heat source side refrigerant and is used to cool the heat medium.

The four expansion valves 16 (expansion valves 16a to 16d) are configured to function as a pressure reducing valve or an expansion device and reduce the pressure of the heat source side refrigerant such that the refrigerant is expanded. The expansion valve 16a is disposed between the expansion valve 16e and the second intermediate heat exchanger 15b. The expansion valve 16b is disposed in parallel to the expansion valve 16a. The expansion valve 16c is disposed between the second intermediate heat exchanger 15b and the first relay unit 3a. The expansion valve 16d is disposed between the first intermediate heat exchanger 15a and the expansion valves 16a and 16b. Each of the four expansion valves 16 may be a component having a variably controllable opening degree, for example, an electronic expansion valve.

The two pumps 21 (a first pump 21a and a second pump 21b) are configured to circulate the heat medium conveyed through the pipe 5. The first pump 21a is disposed in the pipe 5 between the first intermediate heat exchanger 15a and the flow switching valves 22. The second pump 21b is disposed in the pipe 5 between the second intermediate heat exchanger 15b and the flow switching valves 22. Each of the first pump 21a and the second pump 21b may be of any type, for example, a capacity-controllable pump.

Each of the four flow switching valves 22 (flow switching valves 22a to 22d) is a three-way valve and is configured to switch between passages for the heat medium. The flow switching valves 22 in number (four in this case) corresponding to the number of indoor units 2 installed are arranged. Each flow switching valve 22 is disposed on an inlet side of a heat medium passage of the corresponding use side heat exchanger 26 such that one of three ways is connected to the first intermediate heat exchanger 15a, another one of the three ways is connected to the second intermediate heat exchanger 15b, and the other one of the three ways is connected to the stop valve 24. Note that the flow switching valve 22a, the flow switching valve 22b, the flow switching valve 22c, and the flow switching valve 22d are illustrated in that order from the bottom of the drawing sheet so as to correspond to the respective indoor units 2.

Each of the four flow switching valves 23 (flow switching valves 23a to 23d) is a three-way valve and is configured to switch between passages for the heat medium. The flow switching valves 23 in number (four in this case) corresponding to the number of indoor units 2 installed are arranged. Each flow switching valve 23 is disposed on an outlet side of the heat medium passage of the corresponding use side heat exchanger 26 such that one of three ways is connected to the first intermediate heat exchanger 15a, another one of the three ways is connected to the second intermediate heat exchanger 15b, and the other one of the three ways is connected to the flow rate control valve 25. Note that the flow switching valve 23a, the flow switching valve 23b, the flow switching valve 23c, and the flow switching valve 23d are illustrated in that order from the bottom of the drawing sheet so as to correspond to the respective indoor units 2.

Each of the four stop valves 24 (stop valves 24a to 24d) is a two-way valve and is configured to open or close the pipe 5. The stop valves 24 in number (four in this case) corresponding to the number of indoor units 2 installed are arranged. Each stop valve 24 is disposed on the inlet side of the heat medium passage of the corresponding use side heat exchanger 26 such that one of two ways is connected to the use side heat exchanger 26 and the other one of the two ways is connected to the flow switching valve 22. Note that the stop valve 24a, the stop valve 24b, the stop valve 24c, and the stop valve 24d are illustrated in that order from the bottom of the drawing sheet so as to correspond to the respective indoor units 2.

Each of the four flow rate control valves 25 (flow rate control valves 25a to 25d) is a three-way valve and is configured to switch between passages for the heat medium. The flow rate control valves 25 in number (four in this case) corresponding to the number of indoor units 2 installed are arranged. Each flow rate control valve 25 is disposed on the outlet side of the heat medium passage of the corresponding use side heat exchanger 26 such that one of three ways is connected to the use side heat exchanger 26, another one of the three ways is connected to a bypass 27, and the other one of the three ways is connected to the flow switching valve 23. Note that the flow rate control valve 25a, the flow rate control valve 25b, the flow rate control valve 25c, and the flow rate control valve 25d are illustrated in that order from the bottom of the drawing sheet so as to correspond to the respective indoor units 2.

Each bypass 27 is disposed so as to connect the flow rate control valve 25 to the pipe 5 between the stop valve 24 and the use side heat exchanger 26. The bypasses 27 in number (four in this case, specifically, a bypass 27a, a bypass 27b, a bypass 27c, and a bypass 27d) corresponding to the number of indoor units 2 installed are arranged. Note that the bypass 27a, the bypass 27b, the bypass 27c, and the bypass 27d are illustrated in that order from the bottom of the drawing sheet so as to correspond to the respective indoor units 2.

The second relay unit 3b further includes two first temperature sensors 31, two second temperature sensors 32, four third temperature sensors 33, four fourth temperature sensors 34, a fifth temperature sensor 35, a pressure sensor 36, a sixth temperature sensor 37, and a seventh temperature sensor 38. Furthermore, each indoor unit 2 includes an eighth temperature sensor 39. Signals indicating physical quantities detected by such detection devices are transmitted to a controller 60 that controls an operation of the air-conditioning apparatus 100 which will be described later. The signals are used to control, for example, a driving frequency of each pump 21 and switching between passages for the heat medium flowing through the pipes 5.

The first temperature sensors 31 (a first temperature sensor 31a and a first temperature sensor 31b), serving as outgoing heat medium temperature detection devices, each detect the temperature of the heat medium on an outlet side of a heat medium passage of the corresponding intermediate heat exchanger 15. The first temperature sensor 31a is disposed in the pipe 5 on an inlet side of the first pump 21a. The first temperature sensor 31b is disposed in the pipe 5 on an inlet side of the second pump 21b.

The second temperature sensors 32 (a second temperature sensor 32a and a second temperature sensor 32b), serving as incoming heat medium temperature detection devices, each detect the temperature of the heat medium on an inlet side of the heat medium passage of the corresponding intermediate heat exchanger 15. The second temperature sensor 32a is disposed in the pipe 5 on the inlet side of the heat medium passage of the first intermediate heat exchanger 15a. The second temperature sensor 32b is disposed in the pipe 5 on the inlet side of the heat medium passage of the second intermediate heat exchanger 15b.

Each of the third temperature sensors 33 (third temperature sensors 33a to 33d), serving as use-side incoming temperature detection devices, is disposed on a heat medium inlet side of the use side heat exchanger 26 in the corresponding indoor unit 2 and detects the temperature of the heat medium flowing into the use side heat exchanger 26. In FIG. 3, the third temperature sensor 33a, the third temperature sensor 33b, the third temperature sensor 33c, and the third temperature sensor 33d are illustrated in that order from the bottom of the drawing sheet so as to correspond to the indoor units 2a to 2d, respectively.

Each of the fourth temperature sensors 34 (fourth temperature sensors 34a to 34d), serving as use-side outgoing temperature detection devices, is disposed on a heat medium outlet side of the use side heat exchanger 26 in the corresponding indoor unit 2 and detects the temperature of the heat medium flowing out of the use side heat exchanger 26.

In FIG. 3, the fourth temperature sensor 34a, the fourth temperature sensor 34b, the fourth temperature sensor 34c, and the fourth temperature sensor 34d are illustrated in that order from the bottom of the drawing sheet so as to correspond to the indoor units 2a to 2d, respectively.

The fifth temperature sensor 35 is disposed on an outlet side of a heat source side refrigerant passage of the first intermediate heat exchanger 15a and is configured to detect the temperature of the heat source side refrigerant flowing out of the first intermediate heat exchanger 15a. The pressure sensor 36 is disposed on the outlet side of the heat source side refrigerant passage of the first intermediate heat exchanger 15a and is configured to detect the pressure of the heat source side refrigerant flowing out of the first intermediate heat exchanger 15a.

The sixth temperature sensor 37 is disposed on an inlet side of a heat source side refrigerant passage of the second intermediate heat exchanger 15b and is configured to detect the temperature of the heat source side refrigerant flowing into the second intermediate heat exchanger 15b. The seventh temperature sensor 38 is disposed on an outlet side of the heat source side refrigerant passage of the second intermediate heat exchanger 15b and is configured to detect the temperature of the heat source side refrigerant flowing out of the second intermediate heat exchanger 15b.

The eighth temperature sensors 39 (eighth temperature sensors 39a to 39d), serving as air-conditioned temperature detection devices, each detect the temperature (indoor temperature) of air to be conditioned. In FIG. 3, the eighth temperature sensor 39a, the eighth temperature sensor 39b, the eighth temperature sensor 39c, and the eighth temperature sensor 39d are illustrated in that order from the bottom of the drawing sheet so as to correspond to the indoor units 2a to 2d, respectively. A ninth temperature sensor 40, serving as an outdoor air temperature detection device, is provided for, for example, the heat source unit 1 and detects the temperature (outdoor air temperature) of outdoor air. Each of the above-described temperature sensors may be a thermistor or the like.

The pipes 5 through which the heat medium is conveyed include the pipes 5 (hereinafter, referred to as "pipes 5a") connected to the first intermediate heat exchanger 15a and the pipes 5 (hereinafter, referred to as "pipes 5b") connected to the second intermediate heat exchanger 15b. Each of the pipes 5a and 5b branches into pipes (four pipes in this case) which are equal in number to the indoor units 2 connected to the relay unit 3. The pipes 5a and the pipes 5b are connected by the flow switching valves 22, the flow switching valves 23, and the flow rate control valves 25. Whether the heat medium conveyed through the pipe 5a is allowed to flow into the use side heat exchanger 26 or the heat medium conveyed through the pipe 5b is allowed to flow into the use side heat exchanger 26 is determined by controlling the corresponding flow switching valves 22 and 23.

The air-conditioning apparatus 100 further includes the controller 60 that controls operations of the components arranged in the heat source unit 1, the relay unit 3, and the indoor units 2 on the basis of information from a remote control for receiving instructions from the various detecting means and a user. The controller 60 controls, for example, a driving frequency of the compressor 10 disposed in the heat source unit 1, a rotation speed (including ON/OFF) of the air-sending device disposed near the heat source side heat exchanger 12, and switching of the four-way valve 11 to perform any of operation modes, which will be described later. Furthermore, the controller 60 controls a rotation speed (including ON/OFF) of the indoor fan 28 disposed near the use side heat exchanger 26 included in each indoor unit 2.

In addition, the controller 60 controls driving of the pumps 21 arranged in the relay unit 3, opening degrees of the expansion valves 16a to 16e, switching of the flow switching valves 22 and the flow switching valves 23, opening and closing of the stop valves 24, and switching of the flow rate control valves 25. Specifically, the controller 60 has functions of flow rate control means for controlling the flow rate of the heat medium in the relay unit 3, functions of passage determining means for determining a heat medium passage, functions of ON/OFF control means for turning each component on or off, and functions of control target value changing means for appropriately changing a set target value on the basis of information from the various detecting means. In particular, according to Embodiment 1, the controller 60 performs a process of determining the abnormality of the flow rate of the heat medium in the heat medium circuits to protect the pumps 21. The controller 60 includes a microcomputer or the like. The controller 60 further includes a timer 61, serving as a time measuring device, and is accordingly capable of measuring time. The controller 60 further includes a storage unit (not illustrated) for storing data or the like. The controller may be provided for each unit. In this case, the controllers may be enabled to communicate with each other.

The air-conditioning apparatus 100 according to Embodiment 1 further includes an annunciator 62. The annunciator 62 includes a display unit, an audio output unit, or the like to provide information with text displayed, audio output, or the like. The annunciator 62 may be included in, for example, the remote control. In Embodiment 1, when the pumps 21 are stopped due to, for example, the abnormality of the flow rate of the heat medium, the annunciator 62 provides information about such a state.

In the air-conditioning apparatus 100, the compressor 10, the four-way valve 11, the heat source side heat exchanger 12, the refrigerant passage of the first intermediate heat exchanger 15a, the refrigerant passage of the second intermediate heat exchanger 15b, and the accumulator 17 are connected by the refrigerant pipes 4 through which the refrigerant flows, thus providing the refrigeration cycle. In addition, a heat medium passage of the first intermediate heat exchanger 15a, the first pump 21a, and each use side heat exchanger 26 are sequentially connected by the pipes 5a through which the heat medium flows, thus providing a heat medium circuit for heating. Similarly, a heat medium passage of the second intermediate heat exchanger 15b, the second pump 21b, and each use side heat exchanger 26 are sequentially connected by the pipes 5b through which the heat medium flows, thus providing a heat medium circuit for cooling. Specifically, a plurality of use side heat exchangers 26 are connected in parallel with each of the intermediate heat exchangers 15, thus providing the heat medium circuits as multiple systems. The heat medium circuit for heating is provided with a discharge valve 71a disposed in the pipe 5a, the discharge valve 71a being configured to discharge the heat medium from this heat medium circuit. The heat medium circuit for cooling is provided with a discharge valve 71b disposed in the pipe 5b, the discharge valve 71b being configured to discharge the heat medium from this heat medium circuit.

Specifically, in the air-conditioning apparatus 100, the heat source unit 1 is connected to the relay unit 3 through the first intermediate heat exchanger 15a and also the heat source unit 1 is connected to the relay unit 3 through the second intermediate heat exchanger 15b arranged in the relay unit 3, meanwhile, the relay unit 3 is connected to the indoor units 2 through the first intermediate heat exchanger 15a and also the relay unit 3 is connected to the indoor units 2 through the second intermediate heat exchanger 15b. The first intermediate heat exchanger 15a and the second intermediate heat exchanger 15b allow the heat source side refrigerant, serving as a primary refrigerant, circulating through the refrigeration cycle to exchange heat with the heat medium, serving as a secondary refrigerant, circulating through the heat medium circuits.

The kinds of refrigerant used in the refrigeration cycle and the heat medium circuits will now be described. In the refrigeration cycle, a non-azeotropic refrigerant mixture, such as R407C, a near-azeotropic refrigerant mixture, such as R410A or R404A, or a single refrigerant, such as R22 or R134a, can be used. Alternatively, a natural refrigerant, such as carbon dioxide or hydrocarbon, may be used. The use of the natural refrigerant as the heat source side refrigerant can reduce the earth's greenhouse effect caused by refrigerant leakage. In particular, the use of carbon dioxide can improve heat exchange performance for heating or cooling the heat medium in the arrangement in which the heat source side refrigerant and the heat medium are allowed to flow opposite to each other in the first intermediate heat exchanger 15a and the second intermediate heat exchanger 15b as illustrated in FIG. 3, because carbon dioxide in a supercritical state on a high-pressure side exchanges heat without condensing.

As described above, the heat medium circuits are connected to the use side heat exchangers 26 in the indoor units 2. Accordingly, the air-conditioning apparatus 100 is premised on the use of a highly safe heat medium in consideration of the leakage of the heat medium into a room or the like in which the indoor unit 2 is installed. As regards the heat medium, therefore, water, antifreeze, a liquid mixture of water and antifreeze, or the like can be used. A highly heat insulating fluorine inert liquid can be used as the heat medium in consideration of the installation of the indoor unit 2 in a place that dislikes moisture, for example, a computer room. If the heat source side refrigerant leaks from the refrigerant pipe 4, therefore, the leaked heat source side refrigerant can be prevented from entering an indoor space, thus providing high reliability.

<Operation Modes of Air-conditioning Apparatus 100>

The operation modes performed by the air-conditioning apparatus 100 will now be described.

The air-conditioning apparatus 100 enables each indoor unit 2, on the basis of an instruction from the indoor unit 2, to perform a cooling operation or a heating operation. More specifically, the air-conditioning apparatus 100 enables all of the indoor units 2 to perform the same operation and also enables the indoor units 2 to perform different operations. In other words, the air-conditioning apparatus 100 according to Embodiment 1 is an air-conditioning apparatus capable of performing the cooling operation and the heating operation at the same time. Four operation modes performed by the air-conditioning apparatus 100, that is, a cooling only operation mode in which all of the operating indoor units 2 perform the cooling operation, a heating only operation mode in which all of the operating indoor units 2 perform the heating operation, a cooling main operation mode in which a cooling load is larger, and a heating main operation mode in which a heating load will be larger will be described below in accordance with the flows of the refrigerants. For the sake of convenience, some of the temperature sensors are not illustrated in FIGS. 4 to 7 for explaining the operation modes.

(Cooling Only Operation Mode)

FIG. 4 is a refrigerant circuit diagram illustrating the flows of the refrigerants in the cooling only operation mode of the air-conditioning apparatus 100. The cooling only operation mode will be described on the assumption that, for example, a cooling load is generated only in the use side heat exchangers 26a and 26b in FIG. 4. In other words, FIG. 4 illustrates a case where no cooling load is generated in the use side heat exchangers 26c and 26d. In FIG. 4, pipes indicated by thick lines correspond to pipes through which the refrigerants (the heat source side refrigerant and the heat medium) circulate. Furthermore, solid-line arrows indicate the direction of flow of the heat source side refrigerant and that of the heat medium.

In the cooling only operation mode illustrated in FIG. 4, in the heat source unit 1, the four-way valve 11 is switched such that the heat source side refrigerant discharged from the compressor 10 flows into the heat source side heat exchanger 12. In the relay unit 3, the first pump 21a is stopped, the second pump 21b is driven, the stop valves 24a and 24b are opened, and the stop valves 24c and 24d are closed such that the heat medium circulates between the second intermediate heat exchanger 15b and the use side heat exchangers 26 (the use side heat exchangers 26a and 26b). In this state, the operation of the compressor 10 is started.

First, the flow of the heat source side refrigerant in the refrigeration cycle will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the four-way valve 11 and flows into the heat source side heat exchanger 12. In the heat source side heat exchanger 12, the refrigerant condenses and liquefies while transferring heat to outdoor air, such that the refrigerant turns into a high-pressure liquid refrigerant. The high-pressure liquid refrigerant, which has flowed out of the heat source side heat exchanger 12, passes through the check valve 13a, flows out of the heat source unit 1, passes through the refrigerant pipe 4, and flows into the first relay unit 3a. The high-pressure liquid refrigerant, which has flowed into the first relay unit 3a, flows into the gas-liquid separator 14, passes through the expansion valve 16e, and then flows into the second relay unit 3b.

The refrigerant, which has flowed into the second relay unit 3b, is expanded by the expansion valve 16a such that the refrigerant expands into a low-temperature, low-pressure gas-liquid two-phase refrigerant. The gas-liquid two-phase refrigerant flows into the second intermediate heat exchanger 15b, acting as an evaporator, removes heat from the heat medium circulating through the heat medium circuits, such that the refrigerant turns into a low-temperature low-pressure gas refrigerant while cooling the heat medium. The gas refrigerant, which has flowed out of the second intermediate heat exchanger 15b, passes through the expansion valve 16c, flows out of the second relay unit 3b and the first relay unit 3a, passes through the refrigerant pipe 4, and flows into the heat source unit 1. The refrigerant, which has flowed into the heat source unit 1, passes through the check valve 13d, the four-way valve 11, and the accumulator 17, and is again sucked into the compressor 10. The expansion valves 16b and 16d are allowed to have such a small opening degree that the refrigerant does not flow through the valve and the expansion valve 16c is fully opened in order to prevent pressure loss.

Next, the flow of the heat medium in the heat medium circuits will be described.

In the cooling only operation mode, the first pump 21a is stopped and the heat medium accordingly circulates through the pipes 5b. The second pump 21b allows the heat medium cooled by the heat source side refrigerant in the second intermediate heat exchanger 15b to flow through the pipes 5b. The heat medium, pressurized by the second pump 21b, leaving the second pump 21b passes through the flow switching valves 22 (the flow switching valve 22a and the flow switching valve 22b) and the stop valves 24 (the stop valve 24a and the stop valve 24b) and flows into the use side heat exchangers 26 (the use side heat exchanger 26a and the use side heat exchanger 26b). In each use side heat exchanger 26, the heat medium removes heat from an indoor air to cool an air-conditioned area, such as an indoor space, where the indoor unit 2 is installed.

After that, the heat medium flows out of the use side heat exchangers 26 and flows into the flow rate control valves 25 (the flow rate control valve 25a and the flow rate control valve 25b). At this time, each flow rate control valve 25 allows only the amount of heat medium required to provide an air conditioning load needed in the air-conditioned area, such as an indoor space, to flow into the corresponding use side heat exchanger 26. The other heat medium flows through each of the bypasses 27 (the bypass 27a and the bypass 27b) so as to bypass the use side heat exchanger 26.

The heat medium passing through each bypass 27 does not contribute to heat exchange and merges with the heat medium leaving the corresponding use side heat exchanger 26. The resultant heat medium passes through the corresponding flow switching valve 23 (the flow switching valve 23a or the flow switching valve 23b) and flows into the second intermediate heat exchanger 15b and is then again sucked into the second pump 21b. Note that the air conditioning load needed in each air-conditioned area, such as an indoor space, can be provided by controlling the difference between a temperature detected by the third temperature sensor 33 and a temperature detected by the fourth temperature sensor 34 at a target value.

In this case, it is unnecessary to supply the heat medium to each use side heat exchanger 26 having no thermal load (including thermo-off). Accordingly, the corresponding stop valve 24 is closed to block the passage such that the heat medium does not flow into the use side heat exchanger 26. In FIG. 4, the heat medium flows into the use side heat exchanger 26a and the use side heat exchanger 26b because these heat exchangers each have a thermal load. The use side heat exchanger 26c and the use side heat exchanger 26d have no thermal load and the corresponding stop valves 24c and 24d are closed. When a cooling load is generated in the use side heat exchanger 26c or the use side heat exchanger 26d, the stop valve 24c or the stop valve 24d may be opened such that the heat medium is circulated.

(Heating Only Operation Mode)

Figure 5:
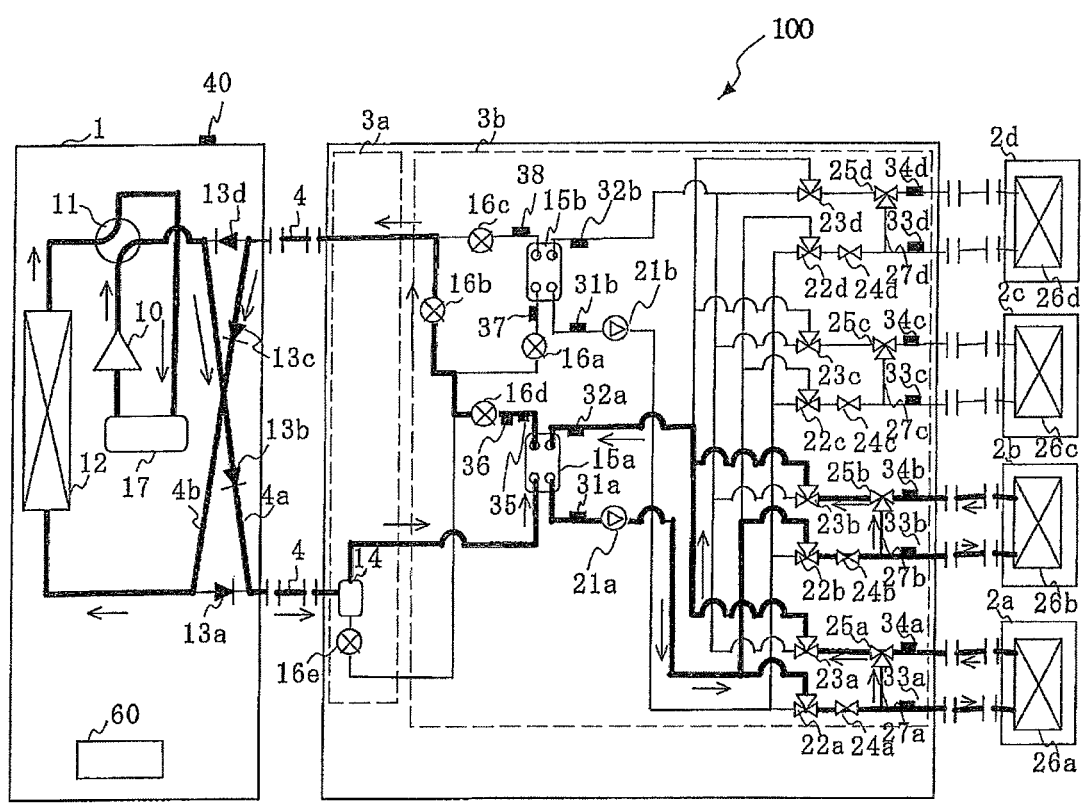
FIG. 5 is a refrigerant circuit diagram illustrating the flows of the refrigerants in a heating only operation mode of the air-conditioning apparatus according to Embodiment 1.

FIG. 5 is a refrigerant circuit diagram illustrating the flows of the refrigerants in the heating only operation mode of the air-conditioning apparatus 100. The heating only operation mode will be described on the assumption that, for example, a heating load is generated only in the use side heat exchangers 26a and 26b in FIG. 5. In other words, FIG. 5 illustrates a case where no heating load is generated in the use side heat exchangers 26c and 26d. In FIG. 5, pipes indicated by thick lines correspond to pipes through which the refrigerants (the heat source side refrigerant and the heat medium) circulate. Furthermore, solid-line arrows indicate the direction of flow of the heat source side refrigerant and that of the heat medium.

In the heating only operation mode illustrated in FIG. 5, in the heat source unit 1, the four-way valve 11 is switched such that the heat source side refrigerant discharged from the compressor 10 flows into the relay unit 3 without passing through the heat source side heat exchanger 12. In the relay unit 3, the first pump 21a is driven, the second pump 21b is stopped, the stop valves 24a and 24b are opened, and the stop valves 24c and 24d are closed to switch between the heat medium flow directions such that the heat medium circulates between the first intermediate heat exchanger 15a and the use side heat exchangers (the use side heat exchanger 26a and the use side heat exchanger 26b). In this state, the operation of the compressor 10 is started.

First, the flow of the heat source side refrigerant in the refrigeration cycle will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the four-way valve 11, flows through the first connecting pipe 4a, passes through the check valve 13b, and flows out of the heat source unit 1. The high-temperature high-pressure gas refrigerant, which has flowed out of the heat source unit 1, passes through the refrigerant pipe 4 and flows into the first relay unit 3a. The high-temperature high-pressure gas refrigerant, which has flowed into the first relay unit 3a, flows into the gas-liquid separator 14 and then flows into the first intermediate heat exchanger 15a. The high-temperature high-pressure gas refrigerant, which has flowed into the first intermediate heat exchanger 15a, condenses and liquefies while transferring heat to the heat medium circulating through the heat medium circuits, such that the refrigerant turns into a high-pressure liquid refrigerant.

The high-pressure liquid refrigerant leaving the first intermediate heat exchanger 15a is expanded by the expansion valve 16d such that the refrigerant expands into a low-temperature, low-pressure gas-liquid two-phase state. The refrigerant in the gas-liquid two-phase state, obtained by expansion through the expansion valve 16d, passes through the expansion valve 16b, flows through the refrigerant pipe 4, and then flows into the heat source unit 1. The refrigerant, which has flowed into the heat source unit 1, passes through the check valve 13c and the second connecting pipe 4b and then flows into the heat source side heat exchanger 12, acting as an evaporator. The refrigerant, which has flowed into the heat source side heat exchanger 12, removes heat from the outdoor air in the heat source side heat exchanger 12, such that the refrigerant turns into a low-temperature low-pressure gas refrigerant. The low-temperature low-pressure gas refrigerant leaving the heat source side heat exchanger 12 passes through the four-way valve 11 and the accumulator 17 and then returns to the compressor 10. The expansion valve 16a, the expansion valve 16c, and the expansion valve 16e are allowed to have such a small opening degree that the refrigerant does not flow through the valve.

Next, the flow of the heat medium in the heat medium circuits will be described.

In the heating only operation mode, the second pump 21b is stopped and the heat medium accordingly circulates through the pipes 5a. The first pump 21a allows the heat medium heated by the heat source side refrigerant in the first intermediate heat exchanger 15a to flow through the pipes 5a. The heat medium, pressurized by the first pump 21a, leaving the first pump 21a passes through the flow switching valves 22 (the flow switching valve 22a and the flow switching valve 22b) and the stop valves 24 (the stop valve 24a and the stop valve 24b) and flows into the use side heat exchangers 26 (the use side heat exchanger 26a and the use side heat exchanger 26b). In each use side heat exchanger 26, the heat medium transfers heat to the indoor air to heat the air-conditioned area, such as an indoor space, where the indoor unit 2 is installed.

After that, the heat medium flows out of the use side heat exchangers 26 and flows into the flow rate control valves 25 (the flow rate control valve 25a and the flow rate control valve 25b). At this time, each flow rate control valve 25 allows only the amount of heat medium required to provide an air conditioning load needed in the air-conditioned area, such as an indoor space, to flow into the corresponding use side heat exchanger 26. The other heat medium flows through each of the bypasses 27 (the bypass 27a and the bypass 27b) so as to bypass the use side heat exchanger 26.

The heat medium passing through each bypass 27 does not contribute to heat exchange and merges with the heat medium leaving the corresponding use side heat exchanger 26. The resultant heat medium passes through the corresponding flow switching valve 23 (the flow switching valve 23a or the flow switching valve 23b) and flows into the first intermediate heat exchanger 15a and is then again sucked into the first pump 21a. Note that the air conditioning load needed in each air-conditioned area, such as an indoor space, can be provided by controlling the difference between a temperature detected by the third temperature sensor 33 and a temperature detected by the fourth temperature sensor 34 at a target value.

In this case, it is unnecessary to supply the heat medium to each use side heat exchanger 26 having no thermal load (including thermo-off). Accordingly, the corresponding stop valve 24 is closed to block the passage such that the heat medium does not flow into the use side heat exchanger 26. In FIG. 5, the heat medium flows into the use side heat exchanger 26a and the use side heat exchanger 26b because these heat exchangers each have a thermal load. The use side heat exchanger 26c and the use side heat exchanger 26d have no thermal load and the corresponding stop valves 24c and 24d are closed. When a heating load is generated in the use side heat exchanger 26c or the use side heat exchanger 26d, the stop valve 24c or the stop valve 24d may be opened such that the heat medium is circulated.

(Cooling Main Operation Mode)

Figure 6:
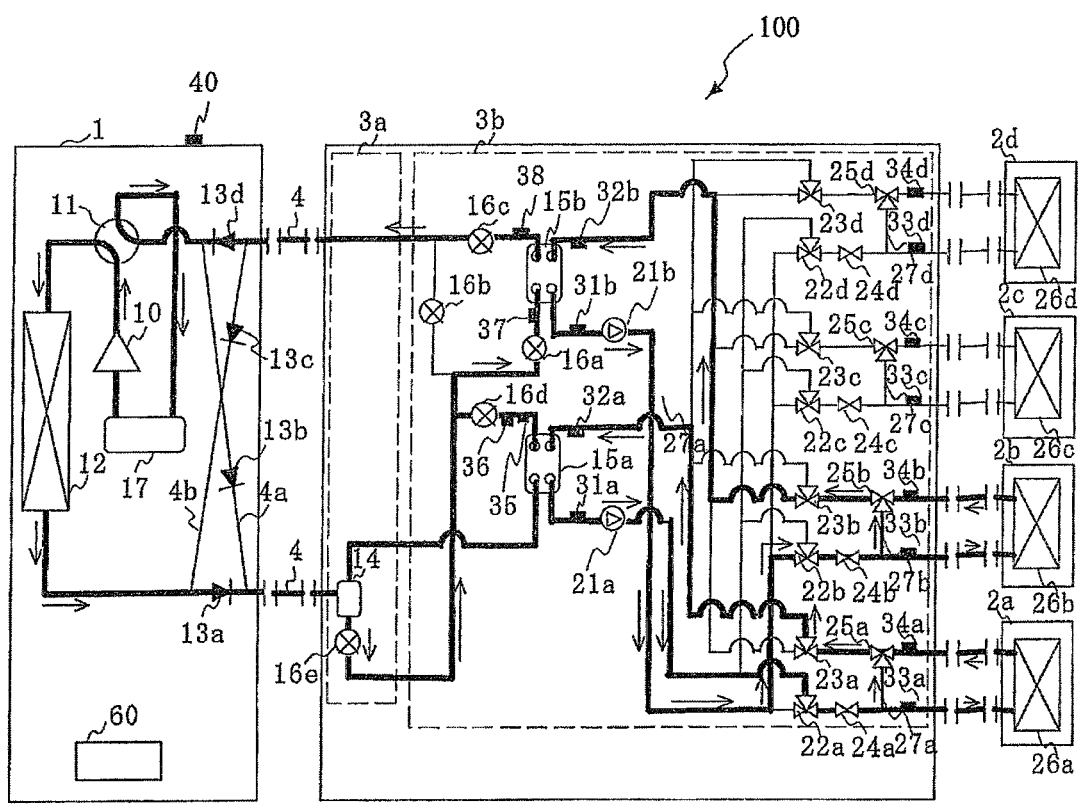
FIG. 6 is a refrigerant circuit diagram illustrating the flows of the refrigerants in a cooling main operation mode of the air-conditioning apparatus according to Embodiment 1.

FIG. 6 is a refrigerant circuit diagram illustrating the flows of the refrigerants in the cooling main operation mode of the air-conditioning apparatus 100. The cooling main operation mode will be described on the assumption that, for example, a heating load is generated in the use side heat exchanger 26a and a cooling load is generated in the use side heat exchanger 26b in FIG. 6. In other words, FIG. 6 illustrates a case where neither heating load nor cooling load is generated in the use side heat exchangers 26c and 26d. In FIG. 6, pipes indicated by thick lines correspond to pipes through which the refrigerants (the heat source side refrigerant and the heat medium) circulate. Furthermore, solid-line arrows indicate the direction of flow of the heat source side refrigerant and that of the heat medium.

In the cooling main operation mode illustrated in FIG. 6, in the heat source unit 1, the four-way valve 11 is switched such that the heat source side refrigerant discharged from the compressor 10 flows into the heat source side heat exchanger 12. In the relay unit 3, the first pump 21a and the second pump 21b are driven, the stop valves 24a and 24b are opened, and the stop valves 24c and 24d are closed such that the heat medium circulates between the first intermediate heat exchanger 15a and the use side heat exchanger 26a and the heat medium circulates between the second intermediate heat exchanger 15b and the use side heat exchanger 26b. In this state, the operation of the compressor 10 is started.

First, the flow of the heat source side refrigerant in the refrigeration cycle will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the four-way valve 11 and flows into the heat source side heat exchanger 12. In the heat source side heat exchanger 12, the refrigerant condenses while transferring heat to the outdoor air, such that the refrigerant turns into a gas-liquid two-phase refrigerant. The gas-liquid two-phase refrigerant, which has flowed out of the heat source side heat exchanger 12, passes through the check valve 13a, flows out of the heat source unit 1, passes through the refrigerant pipe 4, and flows into the first relay unit 3a. The gas-liquid two-phase refrigerant, which has flowed into the first relay unit 3a, flows into the gas-liquid separator 14 such that the refrigerant is separated into a gas refrigerant and a liquid refrigerant. The resultant refrigerants flow into the second relay unit 3b.

The gas refrigerant, obtained by separation through the gas-liquid separator 14, flows into the first intermediate heat exchanger 15a. The gas refrigerant, which has flowed into the first intermediate heat exchanger 15a, condenses and liquefies while transferring heat to the heat medium circulating through the heat medium circuit, such that the refrigerant turns into a liquid refrigerant. The liquid refrigerant, which has flowed out of the first intermediate heat exchanger 15a passes through the expansion valve 16d. On the other hand, the liquid refrigerant, obtained by separation through the gas-liquid separator 14, passes through the expansion valve 16e and merges with the liquid refrigerant leaving the expansion valve 16d after condensation and liquefaction in the first intermediate heat exchanger 15a. The resultant refrigerant is expanded by the expansion valve 16a such that the refrigerant expands into a low-temperature, low-pressure gas-liquid two-phase refrigerant, and then flows into the second intermediate heat exchanger 15b.

The gas-liquid two-phase refrigerant removes heat from the heat medium circulating through the heat medium circuit in the second intermediate heat exchanger 15b, acting as an evaporator, such that the refrigerant turns into a low-temperature low-pressure gas refrigerant while cooling the heat medium. The gas refrigerant, which has flowed out of the second intermediate heat exchanger 15b, passes through the expansion valve 16c, flows out of the second relay unit 3b and the first relay unit 3a, passes through the refrigerant pipe 4, and flows into the heat source unit 1. The refrigerant, which has flowed into the heat source unit 1, passes through the check valve 13d, the four-way valve 11, and the accumulator 17, and is again sucked into the compressor 10. The expansion valve 16b is allowed to have such a small opening degree that the refrigerant does not flow through the valve and the expansion valve 16c is fully opened in order to prevent pressure loss.

Next, the flow of the heat medium in the heat medium circuits will be described.

In the cooling main operation mode, both the first pump 21a and the second pump 21b are driven and the heat medium accordingly circulates through the pipes 5a and 5b.

The first pump 21a allows the heat medium heated by the heat source side refrigerant in the first intermediate heat exchanger 15a to flow through the pipes 5a. The second pump 21b allows the heat medium cooled by the heat source side refrigerant in the second intermediate heat exchanger 15b to flow through the pipes 5b.

The heat medium, pressurized by the first pump 21a, leaving the first pump 21a passes through the flow switching valve 22a and the stop valve 24a, and then flows into the use side heat exchanger 26a. The heat medium transfers heat to the indoor air in the use side heat exchanger 26a to heat the air-conditioned area, such as an indoor space, where the indoor unit 2 is installed. In addition, the heat medium, pressurized by the second pump 21b, leaving the second pump 21b passes through the flow switching valve 22b and the stop valve 24b, and then flows into the use side heat exchanger 26b. The heat medium removes heat from the indoor air in the use side heat exchanger 26b to cool the air-conditioned area, such as an indoor space, where the indoor unit 2 is installed.

The heat medium, used for heating, flows into the flow rate control valve 25a. At this time, the flow rate control valve 25a allows only the amount of heat medium required to provide an air conditioning load needed in the air-conditioned area to flow into the use side heat exchanger 26a. The other heat medium flows through the bypass 27a so as to bypass the use side heat exchanger 26a. The heat medium passing through the bypass 27a does not contribute to heat exchange and merges with the heat medium leaving the use side heat exchanger 26a. The resultant heat medium passes through the flow switching valve 23a and flows into the first intermediate heat exchanger 15a and is then again sucked into the first pump 21a.

Similarly, the heat medium, used for cooling, flows into the flow rate control valve 25b. At this time, the flow rate control valve 25b allows only the amount of heat medium required to provide an air conditioning load needed in the air-conditioned area to flow into the use side heat exchanger 26b. The other heat medium flows through the bypass 27b so as to bypass the use side heat exchanger 26b. The heat medium passing through the bypass 27b does not contribute to heat exchange and merges with the heat medium leaving the use side heat exchanger 26b. The resultant heat medium passes through the flow switching valve 23b and flows into the second intermediate heat exchanger 15b and is then again sucked into the second pump 21b.

Throughout this mode, the flow switching valves 22 (the flow switching valve 22a and the flow switching valve 22b) and the flow switching valves 23 (the flow switching valve 23a and the flow switching valve 23b) allow the warm heat medium (the heat medium used for a heating load) and the cold heat medium (the heat medium used for a cooling load) to flow into the use side heat exchanger 26a having the heating load and the use side heat exchanger 26b having the cooling load, respectively, without mixing with each other. Note that the air conditioning load needed in each air-conditioned area, such as an indoor space, can be provided by controlling the difference between a temperature detected by the third temperature sensor 33 and a temperature detected by the fourth temperature sensor 34 at a target value.

In this case, it is unnecessary to supply the heat medium to each use side heat exchanger 26 having no thermal load (including thermo-off). Accordingly, the corresponding stop valve 24 is closed to block the passage such that the heat medium does not flow into the use side heat exchanger 26. In FIG. 6, the heat medium is allowed to flow into the use side heat exchanger 26a and the use side heat exchanger 26b because these heat exchangers each have a thermal load. The use side heat exchanger 26c and the use side heat exchanger 26d have no thermal load and the corresponding stop valves 24c and 24d are closed. If a heating load or a cooling load is generated in the use side heat exchanger 26c or the use side heat exchanger 26d, the stop valve 24c or the stop valve 24d may be opened such that the heat medium is circulated.

(Heating Main Operation Mode)

Figure 7:
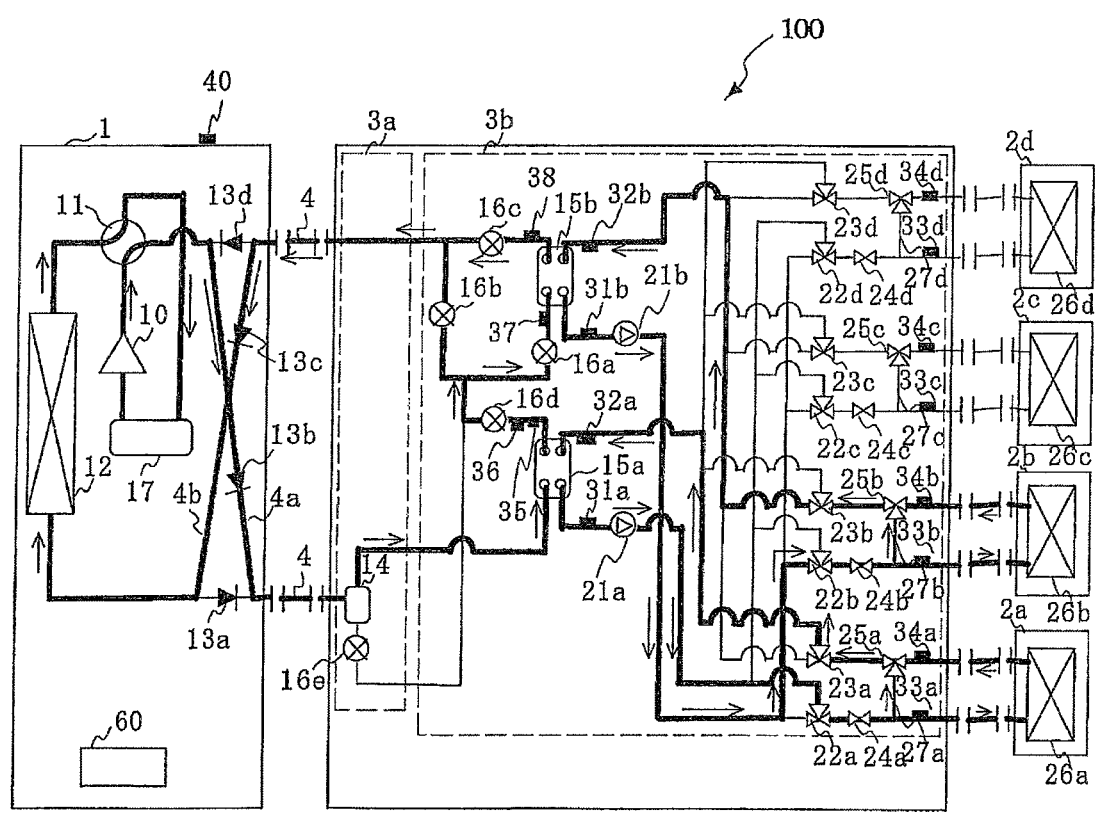
FIG. 7 is a refrigerant circuit diagram illustrating the flows of the refrigerants in a heating main operation mode of the air-conditioning apparatus according to Embodiment 1.

FIG. 7 is a refrigerant circuit diagram illustrating the flows of the refrigerants in the heating main operation mode of the air-conditioning apparatus 100. The heating main operation mode will be described on the assumption that, for example, a heating load is generated in the use side heat exchanger 26a and a cooling load is generated in the use side heat exchanger 26b in FIG. 7. In other words, FIG. 7 illustrates a case where neither heating load nor cooling load is generated in the use side heat exchangers 26c and 26d. In FIG. 7, pipes indicated by thick lines correspond to pipes through which the refrigerants (the heat source side refrigerant and the heat medium) circulate. Furthermore, solid-line arrows indicate the direction of flow of the heat source side refrigerant and that of the heat medium.

In the heating main operation mode illustrated in FIG. 7, in the heat source unit 1, the four-way valve 11 is switched such that the heat source side refrigerant discharged from the compressor 10 flows into the relay unit 3 without passing through the heat source side heat exchanger 12. In the relay unit 3, the first pump 21a and the second pump 21b are driven, the stop valves 24a and 24b are opened, and the stop valves 24c and 24d are closed such that the heat medium circulates between the first intermediate heat exchanger 15a and the use side heat exchanger 26a and the heat medium circulates between the second intermediate heat exchanger 15b and the use side heat exchanger 26b. In this state, the operation of the compressor 10 is started.

First, the flow of the heat source side refrigerant in the refrigeration cycle will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the four-way valve 11, flows through the first connecting pipe 4a, passes through the check valve 13b, and flows out of the heat source unit 1. The high-temperature high-pressure gas refrigerant, which has flowed out of the heat source unit 1, passes through the refrigerant pipe 4 and flows into the first relay unit 3a. The high-temperature high-pressure gas refrigerant, which has flowed into the first relay unit 3a, flows into the gas-liquid separator 14 and then flows into the first intermediate heat exchanger 15a. The high-temperature high-pressure gas refrigerant, which has flowed into the first intermediate heat exchanger 15a, condenses and liquefies while transferring heat to the heat medium circulating in the heat medium circuit, such that the refrigerant turns into a high-pressure liquid refrigerant.

The high-pressure liquid refrigerant leaving the first intermediate heat exchanger 15a is expanded by the expansion valve 16d, such that the refrigerant expands into a low-temperature, low-pressure gas-liquid two-phase state. The refrigerant in the gas-liquid two-phase state, obtained by expansion through the expansion valve 16d, is divided into a flow to the expansion valve 16a and a flow to the expansion valve 16b. As regards the refrigerant flowing through the expansion valve 16a, the refrigerant is further expanded by the expansion valve 16a such that the refrigerant turns into a low-temperature, low-pressure gas-liquid two-phase refrigerant. The resultant refrigerant flows into the second intermediate heat exchanger 15b, acting as an evaporator. The refrigerant, which has flowed into the second intermediate heat exchanger 15b, removes heat from the heat medium in the second intermediate heat exchanger 15b such that the refrigerant turns into a low-temperature low-pressure gas refrigerant. The low-temperature low-pressure gas refrigerant leaving the second intermediate heat exchanger 15b passes through the expansion valve 16c.

As regards the refrigerant flowing through the expansion valve 16b after expansion through the expansion valve 16d, the refrigerant merges with the refrigerant which has passed through the second intermediate heat exchanger 15b and the expansion valve 16c, such that the refrigerant turns into a low-temperature low-pressure refrigerant exhibiting a higher quality. The resultant refrigerant flows out of the second relay unit 3b and the first relay unit 3a, passes through the refrigerant pipe 4, and flows into the heat source unit 1. The refrigerant, which has flowed into the heat source unit 1, passes through the check valve 13c and the second connecting pipe 4b and flows into the heat source side heat exchanger 12, acting as an evaporator. The refrigerant, which has flowed into the heat source side heat exchanger 12, removes heat from the outdoor air in the heat source side heat exchanger 12 such that the refrigerant turns into a low-temperature low-pressure gas refrigerant. The low-temperature low-pressure gas refrigerant leaving the heat source side heat exchanger 12 flows through the four-way valve 11 and the accumulator 17 and then returns to the compressor 10. The expansion valve 16e is allowed to have such a small opening degree that the refrigerant does not flow through the valve.

Next, the flow of the heat medium in the heat medium circuits will be described.

In the heating main operation mode, both the first pump 21a and the second pump 21b are driven and the heat medium accordingly circulates through the pipes 5a and 5b. The first pump 21a allows the heat medium heated by the heat source side refrigerant in the first intermediate heat exchanger 15a to flow through the pipes 5a. The second pump 21b allows the heat medium cooled by the heat source side refrigerant in the second intermediate heat exchanger 15b to flow through the pipes 5b.

The heat medium, pressurized by the first pump 21a, leaving the first pump 21a passes through the flow switching valve 22a and the stop valve 24a and then flows into the use side heat exchanger 26a. The heat medium transfers heat to the indoor air in the use side heat exchanger 26a to heat the air-conditioned area, such as an indoor space, where the indoor unit 2 is installed. In addition, the heat medium, pressurized by the second pump 21b, leaving the second pump 21b passes through the flow switching valve 22b and the stop valve 24b and then flows into the use side heat exchanger 26b. The heat medium removes heat from the indoor air in the use side heat exchanger 26b to cool the air-conditioned area, such as an indoor space, where the indoor unit 2 is installed.

The heat medium leaving the use side heat exchanger 26a flows into the flow rate control valve 25a. At this time, the flow rate control valve 25a allows only the amount of heat medium required to provide an air conditioning load needed in the air-conditioned area, such as an indoor space, to flow into the use side heat exchanger 26a. The other heat medium flows through the bypass 27a so as to bypass the use side heat exchanger 26a. The heat medium passing through the bypass 27a does not contribute to heat exchange and merges with the heat medium leaving the use side heat exchanger 26a. The resultant heat medium passes through the flow switching valve 23a and flows into the first intermediate heat exchanger 15a and is then again sucked into the first pump 21a.

Similarly, the heat medium leaving the use side heat exchanger 26b flows into the flow rate control valve 25b. At this time, the flow rate control valve 25b allows only the amount of heat medium required to provide an air conditioning load needed in the air-conditioned area, such as an indoor space, to flow into the use side heat exchanger 26b. The other heat medium flows through the bypass 27b so as to bypass the use side heat exchanger 26b. The heat medium passing through the bypass 27b does not contribute to heat exchange and merges with the heat medium leaving the use side heat exchanger 26b. The resultant heat medium passes through the flow switching valve 23b and flows into the second intermediate heat exchanger 15b and is then again sucked into the second pump 21b.

Throughout this mode, the flow switching valves 22 (the flow switching valve 22a and the flow switching valve 22b) and the flow switching valves 23 (the flow switching valve 23a and the flow switching valve 23b) allow the warm heat medium and the cold heat medium to flow into the use side heat exchanger 26a having the heating load and the use side heat exchanger 26b having the cooling load, respectively, without mixing with each other. Note that the air conditioning load needed in each air-conditioned area, such as an indoor space, can be provided by controlling the difference between a temperature detected by the third temperature sensor 33 and a temperature detected by the fourth temperature sensor 34 at a target value.

In this case, it is unnecessary to supply the heat medium to each use side heat exchanger 26 having no thermal load (including thermo-off). Accordingly, the corresponding stop valve 24 is closed to block the passage such that the heat medium does not flow into the use side heat exchanger 26. In FIG. 7, the heat medium is allowed to flow into the use side heat exchanger 26a and the use side heat exchanger 26b because these heat exchangers each have a thermal load. The use side heat exchanger 26c and the use side heat exchanger 26d have no thermal load and the corresponding stop valves 24c and 24d are closed. If a heating load or a cooling load is generated in the use side heat exchanger 26c or the use side heat exchanger 26d, the stop valve 24c or the stop valve 24d may be opened such that the heat medium is circulated.

In the air-conditioning apparatus 100 according to Embodiment 1, the controller 60 performs a freeze monitoring process in order to prevent the heat medium from freezing in the heat medium circuits while the circulation of the heat medium is stopped. When determining that the heat medium may freeze, the controller 60 performs a freeze prevention operation and drives the pumps 21 to circulate and heat the heat medium. At this time, to reduce power consumption related to freeze prevention, the heat medium is heated while heat is removed from indoor air in the use side heat exchangers 26 of the indoor units 2 (to supply the amount of heat to the heat medium). If the heat removal from the indoor air is not achieved, heat removal is achieved by operating the refrigeration cycle, thus preventing the heat medium from freezing.

Figure 8:
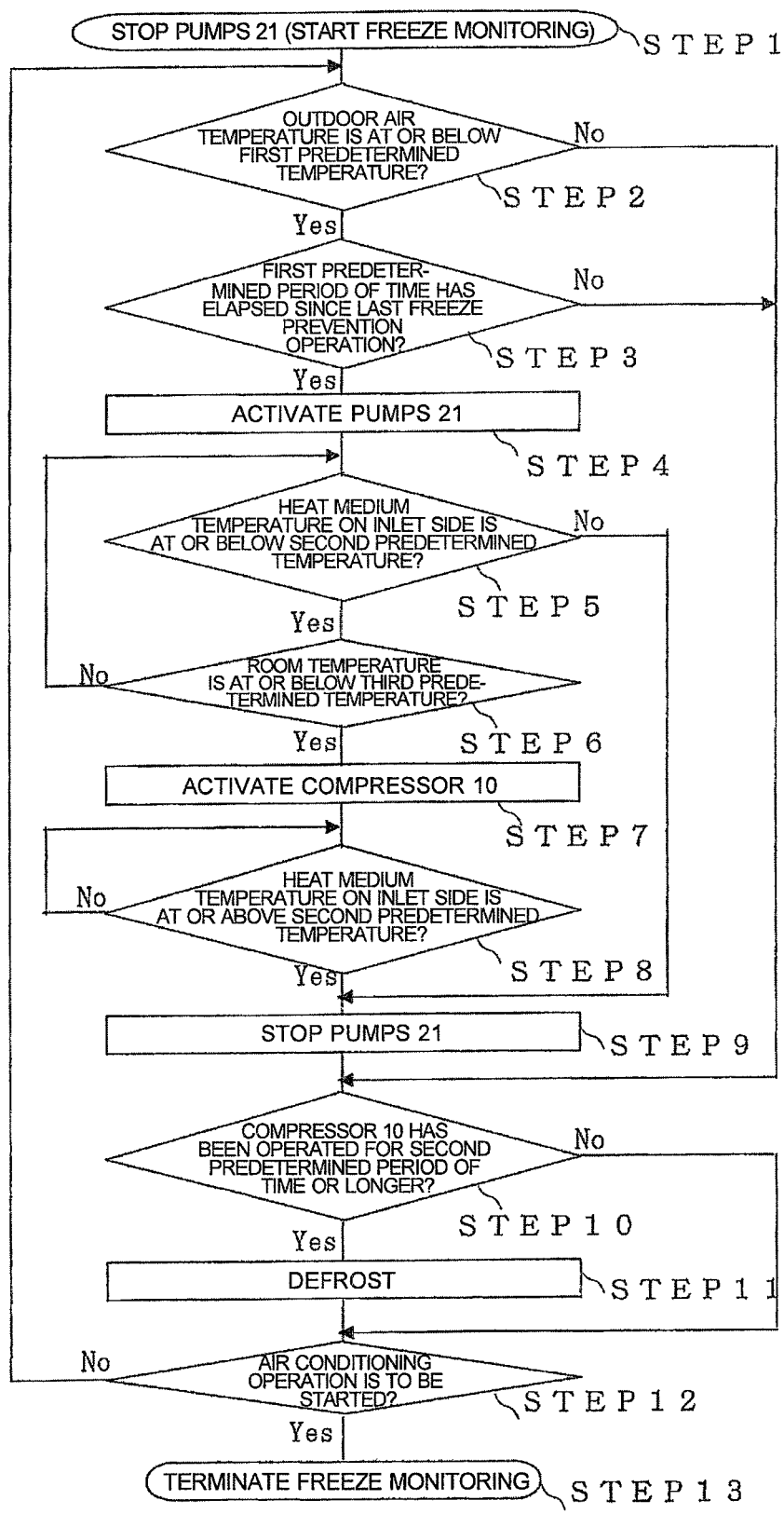
FIG. 8 is a diagram explaining a process for freeze prevention control performed by a controller 60 in Embodiment 1 of the invention.

FIG. 8 is a diagram explaining a process for freeze prevention control performed by the controller 60 according to Embodiment 1 of the invention. Control for preventing, for example, the pipes 5 from being damaged due to freezing of the heat medium in the heat medium circuits caused by a low ambient temperature will be described below with reference to FIG. 3 or the like.

Referring to FIG. 8, in STEP 1, the pumps 21 are stopped to start freeze monitoring. In STEP 2, whether the temperature of outdoor air is at or below a first predetermined temperature at which the heat medium may freeze is determined on the basis of the outdoor air temperature detected by the ninth temperature sensor 40 provided for the heat source unit 1. When it is determined that the outdoor air temperature is at or below the first predetermined temperature, the process proceeds to STEP 3. When it is determined that the outdoor air temperature is not at or below the first predetermined temperature (i.e., above the first predetermined temperature), it is determined that the heat medium will not freeze and the process proceeds to STEP 10.

In STEP 3, whether a first predetermined period of time has elapsed since the last freeze prevention operation was performed on the basis of time measured by the timer 61. This processing is performed to wait for a certain period of time until the temperature of the heat medium heated temporarily by the freeze prevention operation approaches the ambient temperature. Accordingly, the first predetermined period of time can be set in advance. The first predetermined period of time may be arbitrarily determined or changed on the basis of the outdoor air temperature, the temperature of the heat medium, or the like. When it is determined that the first predetermined period of time has elapsed, the process proceeds to STEP 4. When it is determined that the first predetermined period of time has not elapsed, the process proceeds to STEP 10.

In STEP 4, the pumps 21 are activated to start the freeze prevention operation. In STEP 5, whether the temperature of the heat medium on the inlet side of each intermediate heat exchanger 15 detected by the corresponding second temperature sensor 32 is at or below a second predetermined temperature is determined. When it is determined that this temperature is at or below the second predetermined temperature, the process proceeds to STEP 6. When it is determined that this temperature is not at or below the second predetermined temperature (i.e., above the second predetermined temperature), the process proceeds to STEP 9.

In STEP 6, whether each room temperature is at or below a third predetermined temperature is determined. When it is determined that the room temperature is not at or below the third predetermined temperature (i.e., above the third predetermined temperature), the process returns to STEP 5. The heat medium is circulated by driving only the pumps 21 without operating the compressor 10, such that heat removal is performed in the indoor units 2 to heat the heat medium and increase the temperature of the heat medium. At this time, the indoor fan 28 included in each indoor unit 2 may be driven, as necessary, to facilitate heat exchange between the indoor air and the heat medium. On the other hand, the indoor fan 28 may be prevented from being driven when quiet is needed. Furthermore, the heat medium may be allowed to pass through, for example, only the use side heat exchanger 26 in the indoor unit 2 at a high room temperature so as to remove heat. When it is determined that each room temperature is at or below the third predetermined temperature, it is determined that heat removal through the indoor units 2 may not be expected and the process proceeds to STEP 7.

In STEP 7, the compressor 10 in the heat source unit 1 is activated to operate the refrigeration cycle. In this case, the operation mode is set to the heating mode such that the heat medium is heated by heat removal through the heat source unit 1. In the refrigeration cycle, for example, if a high-pressure-side pressure, serving as a target value, is set lower than that in the normal heating mode, the power consumption of the compressor 10 can be reduced, so that the heat medium can be heated efficiently. The same advantages can be achieved by restricting the capacity of the compressor 10 to be lower than that in the normal heating mode.

Figure 9:
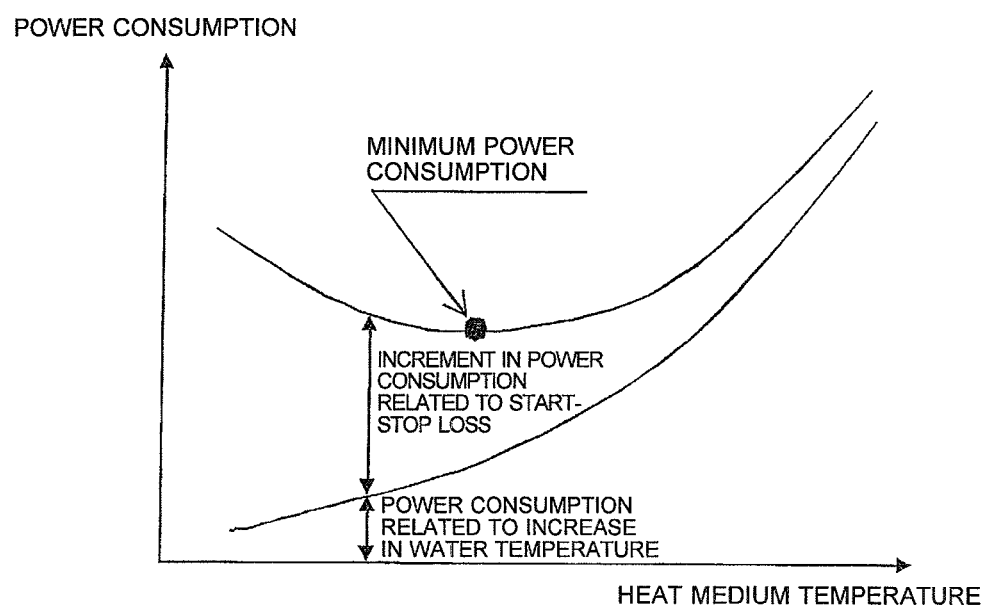
FIG. 9 is a diagram illustrating the relationship between the temperature of a heat medium and power consumption in a freeze prevention operation.

FIG. 9 is a graph illustrating the relationship between the temperature of the heat medium and the power consumption in the freeze prevention operation. In FIG. 9, the horizontal axis represents the temperature of the heat medium and the vertical axis represents the power consumption. In this case, the power consumption related to the compressor 10 is illustrated. As the temperature of the heat medium is increased, the power consumption per freeze prevention operation is also increased. In particular, during the freeze prevention operation, the activation of the compressor 10 leads to an increase in power consumption. Furthermore, the increase in temperature of the heat medium results in an increase in the amount of heat dissipated to the environment, thus increasing energy loss. On the other hand, suppression of an increase in temperature of the heat medium causes the heat medium to soon reach a temperature at which the heat medium may freeze, thus reducing the intervals between the freeze prevention operations. Accordingly, the temperature of the heat medium has to be increased frequently. This increases the number of times of activating and stopping the compressor 10, thus increasing energy loss.

Considering the above-described facts, an optimum temperature at which the power consumption is minimized and to which the temperature of the heat medium should be increased per freeze prevention operation is found in the relationship between the power consumption related to an increase in temperature of the heat medium and the power consumption related to the number of times of driving and stopping the compressor 10. The optimum temperature is obtained in advance by examination or the like. For example, a temperature increased by the ambient temperature and a time interval for driving the pumps 21 to prevent freeze are determined. The control based on the above-described determined temperature and time interval offers the highest efficiency and reliability.

In STEP 8, whether the temperature of the heat medium on the inlet side of each intermediate heat exchanger 15 detected by the corresponding second temperature sensor 32 is at or above the second predetermined temperature is determined on the basis of time measured by the timer 61. When it is determined that this temperature is not at or above the second predetermined temperature (i.e., below the second predetermined temperature), this processing is repeated until it is determined that this temperature is at or above the second predetermined temperature. Thus, the compressor 10 is continuously driven (in the heating mode) until the temperature is at or above the second predetermined temperature. When it is determined that the temperature is at or above the second predetermined temperature, the process proceeds to STEP 9. In STEP 9, the pumps 21 are stopped to terminate the freeze prevention operation. The process then proceeds to STEP 10.

In STEP 10, whether cumulative operation time of the compressor 10 after the start of the freeze monitoring process during suspension of the operation is a second predetermined period of time or longer is determined. If the cumulative operation time of the compressor 10 is long, a large amount of frost may be deposited on the heat source side heat exchanger 12 in the heat source unit 1. This may result in poor start-up of the operation in, for example, the heating mode. Accordingly, when it is determined that the compressor 10 has been operated for the second predetermined period of time or longer, the process proceeds to STEP 11. In STEP 11, the heat source side heat exchanger 12 is defrosted (or allowed to defrost). In addition, the cumulative operation time of the compressor 10 is reset. Any method of defrosting may be used. For example, if the heat source side heat exchanger 12 is provided with a heating device (not illustrated), such as a heater, the heating device may heat the heat source side heat exchanger 12 to melt the frost. Alternatively, the heat source side refrigerant discharged from the compressor 10 may be allowed to flow into the heat source side heat exchanger 12 in order to melt the frost.

On the other hand, when it is determined that the compressor 10 has not been operated for the second predetermined period of time or longer, the process proceeds to STEP 12 without defrosting the heat source side heat exchanger 12. Although whether to perform defrosting is determined on the basis of the cumulative operation time of the compressor 10, the determination is not limited to this case. For example, defrosting may be performed when it is determined that a low-pressure-side pressure is reduced to a predetermined pressure or lower. If the time to perform the heating operation is known in advance, defrosting may be performed just before it.

In STEP 12, whether the operation related to air conditioning is to be started is determined. When it is determined that the air conditioning operation is to be started, the process proceeds to STEP 13 to terminate the freeze monitoring. When it is determined that the air conditioning operation is not to be started, the process returns to STEP 2 to continue the freeze monitoring.

As described above, in the air-conditioning apparatus 100 according to Embodiment 1, when the controller 60 determines that the outdoor temperature is at or below the first predetermined temperature during stopping of the pumps 21 due to, for example, suspension of the operation related to air conditioning, such as heating or cooling, the controller 60 activates the pumps 21 to circulate the heat medium through the heat medium circuits, thus preventing the heat medium from freezing. In addition, when it is determined that the first predetermined period of time has elapsed since the last stopping of the pumps 21 and the temperature of the heat medium may reach its freezing temperature, the pumps 21 are activated. Accordingly, the power consumption can be reduced and energy saving can be achieved because the pumps 21 can be activated when needed to prevent freeze. In this case, setting the first predetermined period of time on the basis of the outdoor air temperature detected by the ninth temperature sensor 40 can further enhance energy saving.

In addition, the pumps are stopped when it is determined that the temperature of the heat medium on the inlet side of each intermediate heat exchanger 15 is at or above the second predetermined temperature set based on the balance between the power consumption related to, for example, an increase in temperature of the heat medium and the power consumption related to, for example, start-stop loss of the compressor 10 or the like in the freeze prevention operation. Advantageously, the power consumption related to the freeze prevention operation can be reduced. In this case, setting the second predetermined temperature on the basis of the outdoor air temperature detected by the ninth temperature sensor 40 enables setting depending on the environment, thus further enhancing energy saving.

In addition, the heat medium is heated to increase the temperature of the heat medium by heat removal through the indoor units 2 until it is determined during the freeze prevention operation that each room temperature is at or below the third predetermined temperature. Advantageously, freeze can be prevented without operating the refrigeration cycle. In this case, driving the indoor fans 28 can facilitate heat exchange between the indoor air and the heat medium.

For example, when it is determined that it is difficult to achieve heat removal through the indoor units 2, the compressor 10 is activated to operate the refrigeration cycle in order to prevent freeze, thus preventing freeze. In this case, setting a target pressure on the high-pressure side in the refrigeration cycle to be lower than that for the normal operation and operating the refrigeration cycle based on the set target pressure reduces the power consumption in the freeze prevention operation, thus achieving energy saving. The same applies to the case where the capacity of the compressor 10 is set lower than that for the normal operation.

In addition, when it is determined that the cumulative operation time of the compressor 10 after the start of the freeze monitoring is the second predetermined period of time or longer, the heat source side heat exchanger 12 is defrosted (or allowed to defrost). Advantageously, frost on the heat source side heat exchanger 12 can be removed by operating the refrigeration cycle in the freeze prevention operation, thus improving start-up of the operation in the heating mode, for example.

Embodiment 2

In Embodiment 1, for example, the first intermediate heat exchanger 15a is used as a heat exchanger for heating the heat medium and the second intermediate heat exchanger 15b is used as a heat exchanger for cooling the heat medium. The configuration of the refrigeration cycle is not limited to that in Embodiment 1. For example, the first intermediate heat exchanger 15a and the second intermediate heat exchanger 15b can be configured to be capable of heating and cooling the heat medium. In such a configuration, both the first intermediate heat exchanger 15a and the second intermediate heat exchanger 15b can be used as heating devices in the heating only operation mode or cooling devices in the cooling only operation mode.

Furthermore, if the heating operation is performed in one heat medium circuit in which the pump 21 is stopped because the abnormality of the flow rate has been determined during a cooling and heating mixed operation, the cooling operation performed in another heat medium circuit may be switched to the heating operation (and vise versa). As regards a criterion for the determination as to whether to switch between the operations, for example, the operation designated first can be preferentially performed, or alternatively the operation with a larger total amount of heat exchange in the use side heat exchangers 26 can be preferentially performed.

Although the air-conditioning apparatus 100 including two or more intermediate heat exchangers 15 for achieving the cooling and heating mixed operation or the like has been described in Embodiments 1 and 2, the invention can be applied to, for example, an air-conditioning apparatus including a single intermediate heat exchanger 15. Furthermore, the invention can be applied to an air-conditioning apparatus including a single indoor unit 2.

Although the heat medium is heated or cooled using the refrigeration cycle through which the heat source side refrigerant is circulated in Embodiments 1 and 2, the heat medium may be heated or cooled by any device.

The invention claimed is:

1. An air-conditioning apparatus comprising:
a refrigeration cycle that includes
a compressor configured to compress a heat source side refrigerant,
a refrigerant flow switching device configured to switch between paths for circulation of the heat source side refrigerant,
a heat source side heat exchanger configured to allow the heat source side refrigerant to exchange heat,
an expansion device configured to regulate a pressure of the heat source side refrigerant, and
at least one intermediate heat exchanger configured to exchange heat between the heat source side refrigerant and a heat medium different from the heat source side refrigerant,
the compressor, the refrigerant flow switching device, the heat source side heat exchanger, the expansion device, and the intermediate heat exchanger being connected by pipes;
a heat medium circuit that includes
at least one pump configured to circulate the heat medium related to heat exchange in the intermediate heat exchanger,
a use side heat exchanger configured to exchange heat between the heat medium and air related to an air-conditioned space, and
a flow switching valve configured to switch between
a first passage for the heat medium, when the heat medium has been heated, through the use side heat exchanger and
a second passage for the heat medium, when the heat medium has been cooled, therethrough,
the pump, the use side heat exchanger, and the flow switching valve being connected by pipes;
an outdoor air temperature detection device configured to detect a temperature of outdoor air; and
a controller configured to,
when the controller determines, after the pump is stopped,
1) that the temperature of the outdoor air detected by the outdoor air temperature detection device is at or below a first predetermined temperature and
2) that a predetermined measure of time since a last freeze prevention operation for the heat medium was performed has elapsed,
perform control to perform, after the compressor is started and stopped, a freeze prevention operation such that the pump is activated to circulate the heat medium through the heat medium circuit during a suspension of the refrigeration cycle.

2. The air-conditioning apparatus of claim 1,
wherein after the activation of the pump, when it is determined by the controller that a temperature of the heat medium is at or above a second predetermined temperature, the controller performs control such that the pump is stopped.

3. The air-conditioning apparatus of claim 1, further comprising
an air-conditioned temperature detection device configured to detect a temperature of air flowing into the use side heat exchanger,
wherein the controller drives a fan for the use side heat exchanger until the controller determines after the activation of the pump that the temperature of air flowing into the use side heat exchanger detected by the air-conditioned temperature detection device is at or below a third predetermined temperature.

4. The air-conditioning apparatus of claim 1,
wherein the controller performs control after the activation of the pump such that the refrigeration cycle is operated to heat the heat medium.

5. The air-conditioning apparatus of claim 4,
wherein when the refrigeration cycle is operated, a target pressure in high-pressure-side part of the refrigeration cycle is set lower than a pressure during a normal operation, or alternatively an upper limit capacity of the compressor in the refrigeration cycle is set lower than a capacity during the normal operation.

6. The air-conditioning apparatus of claim 4,
wherein after the activation of the pump, when it is determined by the controller that a driving time of the compressor is a second predetermined period of time or longer, the controller stops the pump and then allows the heat source side heat exchanger to defrost.

7. The air-conditioning apparatus of claim 1,
wherein the controller sets the first predetermined period of time on a basis of the temperature of the outdoor air.

8. The air-conditioning apparatus of claim 2,
wherein the controller sets the second predetermined temperature on a basis of the temperature of the outdoor air.

9. The air-conditioning apparatus of claim 2, further comprising
an air-conditioned temperature detection device configured to detect the temperature of air flowing into the use side heat exchanger,
wherein the controller drives a fan for the use side heat exchanger until the controller determines after the activation of the pump that the temperature detected by the air-conditioned temperature detection device is at or below a third predetermined temperature.

10. The air-conditioning apparatus of claim 2,
wherein the controller performs control after the activation of the pump such that the refrigeration cycle is operated to heat the heat medium.

11. The air-conditioning apparatus of claim 3,
wherein the controller performs control after the activation of the pump such that the refrigeration cycle is operated to heat the heat medium.

12. The air-conditioning apparatus of claim 10,
wherein when the refrigeration cycle is operated, a target pressure in high-pressure-side part of the refrigeration cycle is set lower than a pressure during a normal operation, or alternatively an upper limit capacity of the compressor in the refrigeration cycle is set lower than a capacity during the normal operation.

13. The air-conditioning apparatus of claim 11,
wherein when the refrigeration cycle is operated, a target pressure in high-pressure-side part of the refrigeration cycle is set lower than a pressure during a normal operation, or alternatively an upper limit capacity of the compressor in the refrigeration cycle is set lower than a capacity during the normal operation.

14. The air-conditioning apparatus of claim 5,
wherein after the activation of the pump, when it is determined by the controller that a driving time of the compressor is a second predetermined period of time or longer, the controller stops the pump and then allows the heat source side heat exchanger to defrost.

15. The air-conditioning apparatus of claim 2,
wherein the controller sets the first predetermined period of time on a basis of the temperature of the outdoor air.

16. The air-conditioning apparatus of claim 3,
wherein the controller sets the first predetermined period of time on a basis of the temperature of the outdoor air.

17. The air-conditioning apparatus of claim 4,
wherein the controller sets the first predetermined period of time on a basis of the temperature of the outdoor air.

18. The air-conditioning apparatus of claim 5,
wherein the controller sets the first predetermined period of time on a basis of the temperature of the outdoor air.

19. The air-conditioning apparatus of claim 6,
wherein the controller sets the first predetermined period of time on a basis of the temperature of the outdoor air.

\* \* \* \* \*